(12) United States Patent
Babich

(10) Patent No.: US 11,784,780 B2
(45) Date of Patent: *Oct. 10, 2023

(54) CLOCK SYNCHRONIZATION WHEN SWITCHING BETWEEN BROADCAST AND DATA TRANSMISSION MODES

(71) Applicant: Skywave Networks LLC, Chicago, IL (US)

(72) Inventor: Kevin J. Babich, Valparaiso, IN (US)

(73) Assignee: Skywave Networks LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/643,956

(22) Filed: Dec. 13, 2021

(65) Prior Publication Data

US 2022/0353052 A1  Nov. 3, 2022

Related U.S. Application Data

(63) Continuation of application No. 15/929,271, filed on Apr. 21, 2020, now Pat. No. 11,201,720, which is a
(Continued)

(51) Int. Cl.
*H04L 7/00* (2006.01)
*H04H 20/26* (2008.01)

(52) U.S. Cl.
CPC ............ *H04L 7/0008* (2013.01); *H04H 20/26* (2013.01)

(58) Field of Classification Search
CPC ......... H04L 7/0008; H04L 7/00; H04H 20/26; H04H 20/86; H04H 20/33; H04H 40/09; H04B 7/22
See application file for complete search history.

(56) References Cited

U.S. PATENT DOCUMENTS 4,475,085 A  10/1984  Yahata et al.
4,481,640 A  11/1984  Chow et al.
(Continued)

FOREIGN PATENT DOCUMENTS

CA   3116833 A1 * 5/2019 ............... H04B 7/22
CN   101404540 A * 4/2009 ............. H04L 7/041
(Continued)

OTHER PUBLICATIONS

Rowe et al., RT-Link: A Time-Sychronized Link Protocol for Energy-Constrained Multi-Hop Wireless Networks, IEEE Communications Society, IEEE SECON 2006 proceedings (Year: 2006), 10 pages, Jan. 1, 2006.
(Continued)

*Primary Examiner* — Berhanu Tadese
(74) *Attorney, Agent, or Firm* — Woodard, Emhardt, Henry, Reeves & Wagner, LLP

(57) ABSTRACT

A communication system allows for clock synchronization between a transmitter and a receiver when switching from transmission of an analog signal to transmission of a digital signal. The system uses clock synchronization during transmission of the digital signal, but the clock synchronization may be lost when switching to transmission of an analog signal. A digital clock synchronization is embedded in the analog signal so that the clock synchronization between the transmitter and the receiver may be reestablished upon switching to a digital signal without any delay in transmission of the digital signal.

16 Claims, 9 Drawing Sheets

Related U.S. Application Data continuation of application No. PCT/US2018/057022, filed on Oct. 23, 2018.

(60) Provisional application No. 62/576,253, filed on Oct. 24, 2017.

(56) References Cited

U.S. PATENT DOCUMENTS

| | | | |
|---|---|---|---|
| 4,553,251 A | 11/1985 | Hartmann | |
| 4,665,404 A * | 5/1987 | Christy | G01S 11/08 342/463 |
| 4,910,610 A | 3/1990 | Utsugi | |
| 4,965,825 A * | 10/1990 | Harvey | H04N 21/00 380/233 |
| 5,257,404 A * | 10/1993 | Goreham | H04H 20/67 455/503 |
| 5,509,035 A * | 4/1996 | Teidemann, Jr. | H04J 3/0682 375/E1.006 |
| 5,584,051 A * | 12/1996 | Goken | H04H 20/22 455/142 |
| 5,636,249 A | 6/1997 | Roither | |
| 5,726,992 A | 3/1998 | Roither | |
| 5,761,255 A * | 6/1998 | Shi | H03L 7/24 375/360 |
| 5,765,128 A | 6/1998 | Tsuboi et al. | |
| 5,832,024 A * | 11/1998 | Schotz | H04B 1/04 370/324 |
| 5,901,188 A * | 5/1999 | Roither | H04L 7/033 327/12 |
| 5,946,343 A * | 8/1999 | Schotz | H04H 20/61 375/141 |
| 5,956,373 A | 9/1999 | Goldston et al. | |
| 6,005,894 A * | 12/1999 | Kumar | H04H 20/36 375/321 |
| 6,332,086 B2 * | 12/2001 | Avis | H04B 7/2662 455/574 |
| 6,359,923 B1 * | 3/2002 | Agee | H04L 5/0021 375/135 |
| 6,377,640 B2 * | 4/2002 | Trans | H04L 1/0047 375/354 |
| 6,418,300 B1 | 7/2002 | Laurent | |
| 6,611,537 B1 * | 8/2003 | Edens | H04N 21/4363 375/E7.274 |
| 6,611,678 B1 * | 8/2003 | Zweig | H03J 1/0091 455/161.3 |
| 6,665,308 B1 * | 12/2003 | Rakib | H04L 27/362 370/479 |
| 7,170,950 B2 | 1/2007 | Wildhagen et al. | |
| 7,383,028 B2 * | 6/2008 | Suzuki | H04L 7/0054 455/108 |
| 7,587,017 B2 * | 9/2009 | Smith | H04H 20/49 375/376 |
| 7,805,748 B1 | 9/2010 | Harvey et al. | |
| 7,831,204 B1 * | 11/2010 | Harvey | H04N 21/818 455/39 |
| 7,933,569 B2 * | 4/2011 | Suzuki | H04L 7/0054 455/108 |
| 8,259,719 B2 * | 9/2012 | Sharma | H04H 20/26 370/432 |
| 8,264,397 B2 * | 9/2012 | Paek | G01S 13/003 342/31 |
| 8,451,868 B2 * | 5/2013 | Johnson | H04N 21/439 725/112 |
| 8,621,547 B1 | 12/2013 | Harvey et al. | |
| 8,666,089 B2 * | 3/2014 | Elkins | H04H 20/26 381/86 |
| 8,768,714 B1 | 7/2014 | Blesser | |
| 8,918,326 B1 | 12/2014 | Blesser | |
| 8,918,333 B2 * | 12/2014 | Harb | G06Q 30/0277 725/42 |
| 8,989,214 B2 * | 3/2015 | Ding | H04L 7/0054 375/232 |
| 9,136,938 B1 * | 9/2015 | Babich | H04B 10/25 |
| 9,173,177 B2 | 10/2015 | Touret | |
| 9,178,504 B2 | 11/2015 | Komori | |
| 9,456,402 B2 * | 9/2016 | Linden | H04L 41/0853 |
| 9,584,193 B2 * | 2/2017 | Stratigos, Jr. | H04B 1/0003 |
| 9,596,044 B2 * | 3/2017 | Nekhamkin | G10L 19/00 |
| 9,671,761 B2 | 6/2017 | Dougan et al. | |
| 9,940,632 B2 * | 4/2018 | Harb | G06F 16/60 |
| 10,115,404 B2 * | 10/2018 | Blesser | G10L 19/018 |
| 10,470,145 B1 * | 11/2019 | Rausch | H04H 20/86 |
| 10,707,980 B2 * | 7/2020 | Littlejohn | H04L 67/02 |
| 10,809,412 B2 * | 10/2020 | Di | G01V 3/12 |
| 10,998,991 B2 * | 5/2021 | Lerner | H04H 60/51 |
| 11,201,720 B2 * | 12/2021 | Babich | H04H 20/86 |
| 11,271,689 B2 * | 3/2022 | Babich | H04B 7/22 |
| 2002/0034973 A1 | 3/2002 | Avis | |
| 2002/0122465 A1 | 9/2002 | Agee et al. | |
| 2002/0181633 A1 * | 12/2002 | Trans | H04L 1/0002 375/354 |
| 2003/0060156 A1 * | 3/2003 | Giaccherini | H04B 7/18508 455/410 |
| 2004/0247109 A1 | 12/2004 | Nakata | |
| 2006/0206582 A1 * | 9/2006 | Finn | H04L 63/10 709/217 |
| 2006/0258308 A1 * | 11/2006 | Fassbender | H04H 60/27 455/132 |
| 2007/0009073 A1 | 1/2007 | Kushiyama | |
| 2008/0008285 A1 | 1/2008 | Smith et al. | |
| 2009/0106629 A1 | 4/2009 | Araki | |
| 2009/0154542 A1 | 6/2009 | Ding et al. | |
| 2011/0007843 A1 * | 1/2011 | Khorram | H03G 3/3042 375/302 |
| 2011/0149992 A1 | 6/2011 | Sharma et al. | |
| 2012/0098697 A1 | 4/2012 | Paek et al. | |
| 2012/0105362 A1 | 5/2012 | Kremin et al. | |
| 2012/0192244 A1 | 7/2012 | Takaki et al. | |
| 2012/0310517 A1 | 12/2012 | van den Oever | |
| 2013/0156130 A1 | 6/2013 | Elkins et al. | |
| 2013/0179275 A1 | 7/2013 | Harb | |
| 2013/0254159 A1 * | 9/2013 | Thramann | H04N 21/8358 707/609 |
| 2014/0046775 A1 * | 2/2014 | Harb | G06F 16/60 705/14.66 |
| 2014/0086588 A1 | 3/2014 | Kawanishi et al. | |
| 2014/0359673 A1 | 12/2014 | Striuli | |
| 2015/0029058 A1 | 1/2015 | Robey | |
| 2015/0193516 A1 | 7/2015 | Harb | |
| 2015/0249486 A1 * | 9/2015 | Stratigos, Jr. | H04B 7/022 370/328 |
| 2016/0036519 A1 | 2/2016 | Loomis et al. | |
| 2016/0170381 A1 | 6/2016 | Mininger et al. | |
| 2016/0197669 A1 | 7/2016 | Babich | |
| 2017/0025128 A1 | 1/2017 | Blesser et al. | |
| 2017/0025129 A1 | 1/2017 | Blesser et al. | |
| 2019/0087121 A1 | 3/2019 | Kobayashi et al. | |
| 2019/0115990 A1 | 4/2019 | Littlejohn | |
| 2019/0196046 A1 | 6/2019 | Di et al. | |
| 2020/0077139 A1 | 3/2020 | Cox et al. | |
| 2020/0228115 A1 | 7/2020 | Hou | |
| 2020/0244352 A1 | 7/2020 | Babich | |
| 2021/0044368 A1 | 2/2021 | Lerner et al. | |
| 2021/0075502 A1 * | 3/2021 | Babich | G06F 16/907 |
| 2021/0075584 A1 * | 3/2021 | Babich | H04L 7/0008 |

FOREIGN PATENT DOCUMENTS

| | | | | |
|---|---|---|---|---|
| CN | 102171677 A | * | 8/2011 | H04H 60/12 |
| CN | 102165721 B | * | 9/2014 | H04H 20/31 |
| CN | 104160678 A | * | 11/2014 | H04L 67/104 |
| CN | 108028817 A | * | 5/2018 | G01S 19/14 |
| CN | 111512588 A | * | 8/2020 | H04B 7/22 |
| EP | 2629442 A1 | * | 8/2013 | H04L 1/0006 |
| EP | 2629442 B1 | * | 12/2014 | H04L 1/0006 |
| EP | 3701663 A2 | * | 9/2020 | H04B 7/22 |
| EP | 3701663 A2 | | 9/2020 | |
| EP | 3701663 A4 | * | 7/2021 | H04B 7/22 |
| FR | 2681997 A1 | * | 4/1993 | H04H 20/28 |
| GB | 202007723 | | 7/2020 | |

(56) References Cited

FOREIGN PATENT DOCUMENTS

| | | | | |
|---|---|---|---|---|
| GB | 2581930 A * | 9/2020 | ............... | H04B 7/22 |
| GB | 2581930 A1 | 9/2020 | | |
| JP | 59-182668 A | 10/1984 | | |
| JP | 2002261635 A * | 9/2002 | ............. | H04H 20/22 |
| JP | 4002110 B2 * | 10/2007 | ............. | H04H 20/22 |
| JP | 2012041654 A * | 3/2012 | | |
| JP | 5584051 B2 * | 9/2014 | | |
| WO | WO-9309615 A1 * | 5/1993 | ............. | H04H 20/22 |
| WO | WO-9729550 A1 * | 8/1997 | ............... | H04B 1/04 |
| WO | WO-9907077 A2 * | 2/1999 | ............... | H04B 1/00 |
| WO | WO-2007060547 A2 * | 5/2007 | ....... | G06K 19/07732 |
| WO | WO-2014005016 A1 * | 1/2014 | ............... | G04G 7/00 |
| WO | WO-2015013602 A2 * | 1/2015 | ............... | G01S 11/02 |
| WO | 2019083948 A2 | 5/2019 | | |
| WO | WO-2019083948 A2 * | 5/2019 | ............... | H04B 7/22 |
| WO | 2019083948 A3 | 7/2019 | | |
| WO | WO-2019083948 A3 * | 7/2019 | ............... | H04B 7/22 |

OTHER PUBLICATIONS

Rowe et al., RT-Link: A global time-synchronized link protocol for sensor networks, Ad Hoc Networks, Elsevier, vol. 6 No. 8 (Year: 2008), 20 pages, Nov. 1, 2008.
Arikan, Toros, Thesis—Minimum-Delay HF Communications, University of Illinois at Urbana-Champaign Retrieved from the Internet: https://www.ideals.illinois.edu/bitstream/handle/2142/97507/ARIKAN-THESIS-2017.pdf?sequence=1, 60 pages, Nov. 28, 2017.
PCT, Intl. App. No. PCT/US2018/057022, International Preliminary Report on Patentability, 6 pages, dated May 21, 2019.
PCT, Intl. App. No. PCT/US2018/057022, International Search Report, 3 pages, dated May 21, 2019.
PCT, Intl. App. No. PCT/US2018/057022, Written Opinion of the International Searching Authority, 5 pages, dated May 21, 2019.
EP, European Patent Application 18871025.5 Extended European Search Report, 9 pages, dated Jun. 28, 2021.

* cited by examiner

CLOCK SYNCHRONIZATION WHEN SWITCHING BETWEEN BROADCAST AND DATA TRANSMISSION MODES

CROSS-REFERENCE TO RELATED APPLICATION

This application is a continuation of U.S. patent application Ser. No. 15/929,271, filed Apr. 21, 2020, which is hereby incorporated by reference. U.S. patent application Ser. No. 15/929,271, filed Apr. 21, 2020, is a continuation of International Patent Application Number PCT/US2018/057022, filed Oct. 23, 2018, which are hereby incorporated by reference. International Patent Application Number PCT/US2018/057022, filed Oct. 23, 2018, claims the benefit of U.S. Patent Application No. 62/576,253, filed Oct. 24, 2017, which are hereby incorporated by reference.

BACKGROUND

The Federal Communications Commission (FCC) requires broadcast stations to provide identification at the beginning and end of each period of operation as well as hourly, as close to the beginning of the hour as possible. Typically the station identifier is broadcast in an AM or FM format, so that a digital broadcast system has to switch to an Amplitude Modulation (AM) or Frequency Modulation (FM) signal to provide identification and then switch back to digital to resume digital transmission. When switching between digital transmission and an AM or FM transmission, the clock synchronization between the transmitter and the receiver may be interrupted. Clock synchronization may be reestablished after switching back to digital transmission; however, this process may take time and cause a delay during synchronization. Thus, there is a need for improvement in this field.

SUMMARY

A communication system uses may be used to provide a low latency communication pathway for data between remotely located transmitter and receiver stations, such as located in North America and Europe. Generally speaking, the overall system operates in two modes, a data transmission mode and a broadcast mode. In the data transmission mode, data is transmitted in a digital form between the transmitter and receiver. On off hours when data transmission is not needed, such as when stock exchanges are closed, the transmitter broadcasts music, news, entertainment, and/or other audio information to the general public, such as via an AM or FM signal, or even a phase modulation (PM) signal. In one form, the digital data signal and the AM signal are transmitted at different frequencies, but in other variations, they can share the same general frequency band.

When in a data transmission mode, the system attempts to communicate the data as fast as physically possible, that is, with the lowest practical latency. Normally, but not always, the data is transmitted using a digital signal which requires clock synchronization between the transmitter and receiver. The clocks at the transmitter and receiver typically set their clocks at least in part based on time data received from a Global Positioning System (GPS). During transmission, the radio data signal is bounced off the ionosphere. Due to changes in ionospheric conditions and other environmental changes, the path length of the digital signal between the transmitter and the receiver changes which in turn leads to signal distortions such as Doppler shifting. So the receiver is able to remove or adjust to these distortions, the transmitted digital signal includes a clock signal that helps synchronize the transmitter and receiver.

As part of the broadcast license, the FCC requires broadcasters to interrupt their normally scheduled programming in order to provide a station identifier (ID) on an hourly basis (or at other intervals). The station ID may be transmitted using the AM broadcast signal. While this is usually not a problem during the broadcast mode as latency is not a concern, during the data transmission mode, the receiver has to switch from the digital signal to the AM signal. During this switch to the AM signal, the clock synchronization signal is lost. Upon switching back to the digital data transmission signal, there is a delay caused by reestablishing the clock synchronization between the transmitter and receiver. This delay can be problematic because the information transmitted via the digital data signal is extremely time sensitive.

To address this issue, a digital low bit rate clock synchronization signal is embedded in the AM station ID signal so that clock synchronization between the transmitter and receiver is maintained. This in turn eliminates the delay caused by the reestablishment of the clock synchronization when switching from the AM station ID signal back to the digital data transmission signal. In one form, the digital low bit rate clock synchronization signal is modulated using phase modulation, but it can be modulated in other ways. Normally, the digital low bit rate clock synchronization signal is transmitted during the entire station ID break (i.e., when the AM station ID signal is broadcasted), but in other variations, the digital low bit rate clock synchronization signal can be transmitted just before reestablishment of the digital data transmission signal so long as clock synchronization is established on or before data transmission occurs without any delay.

This technique can be also used to maintain clock synchronization when changing from the broadcast mode to the data transmission mode. In a particular example, the digital low bit rate clock synchronization signal can be transmitted during a music broadcast before trading on the stock exchanges start so that the transmitter and receiver are immediately synchronized when switched to the data transmission mode. In one variation, the digital low bit rate clock synchronization signal is transmitted during the entire broadcast, and in another variation, it is transmitted just before switching to the data transmission mode, like in the earlier example.

In a more general sense, this technique can be used to maintain or reestablish clock synchronization without delay when switching from an analog signal, such as audio and/or older analog television (NTSC or PAL) broadcast signal, to a digital signal, such as for data transmission or other forms of communication that need low latency.

While the system will be described with reference to executing financial trading strategies, this system and technique can be used in other situations or industries where time and bandwidth are of concern. For example, this system can be used to perform remote surgery or medical diagnostics, scientific instruments or studies (e.g., for astronomy or physics), controlling dispersed global computer networks, and/or military applications. This system and technique can for example be adapted for incorporation into earthquake/tsunami early warning systems.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
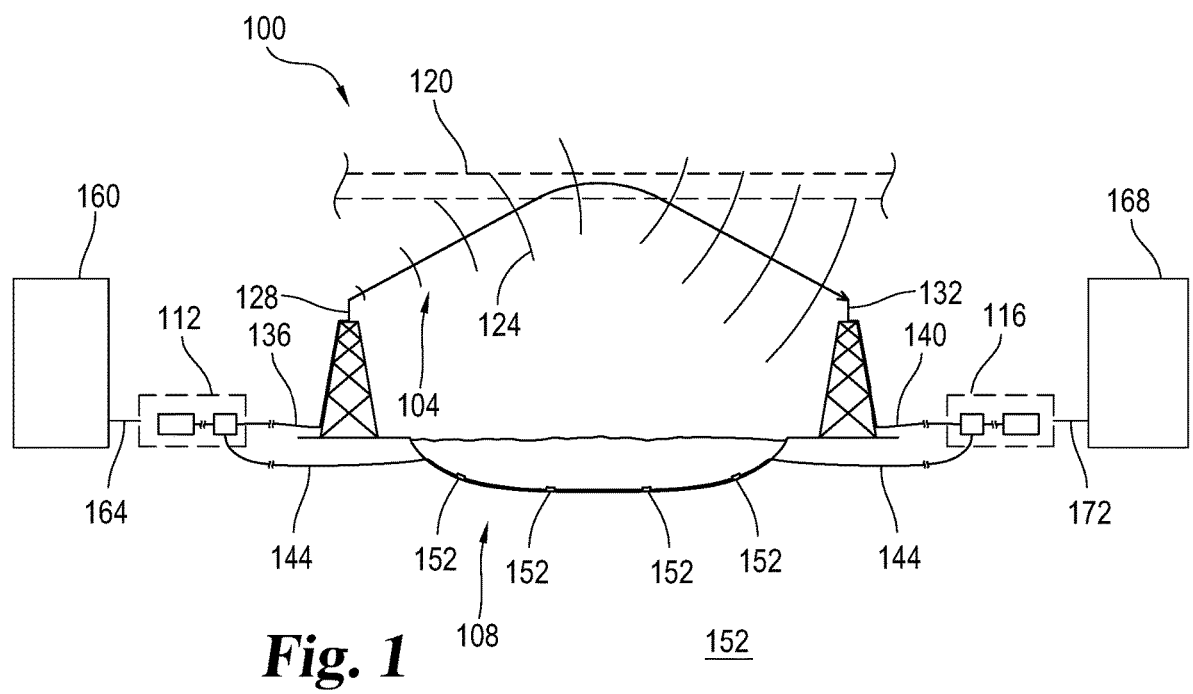
FIG. 1 is a schematic diagram of a system for transmitting data over separate communication links, one of which uses skywave propagation.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 illustrates one example of a communication system 100 configured to transfer data via a low latency, low bandwidth communication link 104, and separate data via a high latency, high bandwidth communication link 108. The communication links 104 and 108 provide separate connections between a first communication node 112 and a second communication node 116. The low latency connection 104 may be configured to transmit data using electromagnetic waves 124 passing through free space via skywave propagation. The electromagnetic waves 124 may be generated by a transmitter in the first communication node 112, passed along a transmission line 136 to an antenna 128. The electromagnetic waves 124 may be radiated by the antenna 128 encountering an ionized portion of the atmosphere 120. This radiated electromagnetic energy may then be refracted by the ionized portion of the atmosphere 120 causing the waves 124 to redirect toward earth. The waves 124 may be received by a receiving antenna 132 coupled to the second communications node 116 by the transmission line 140. As illustrated in FIG. 1, a transmitting communication node may use skywave propagation to transmit electromagnetic energy long distances across the earth surface without the need of one or more transmission lines to carry the electromagnetic energy.

Data may also be transmitted between the communications nodes 112 and 116 using a high latency communication link 108. As illustrated in FIG. 1, the high latency communication link 108 may be implemented using a transmission line 144 passing through the earth, which may include passing under or through an ocean or other body of water. As shown in FIG. 1, the high latency communication link 108 may include repeaters 152. FIG. 1 illustrates four repeaters 152 along the transmission line 144 although any suitable number of repeaters 152 may be used. The transmission line 144 may also have no repeaters at all. Although FIG. 1 illustrates the communication link 104 transmitting information from the first communication node 112 to the second communication node 116, the data transmitted may pass along the communication links 104, 108 in both directions.

A client 160 may have a connection 164 to the first communication node 112. The client 160 may send instructions over the connection 164 to the first communication node 112. At the first communication node 112, the instructions are prepared to be sent to the second communication node 116, either by the low latency link 104 or the high latency link 108, or both. The second communication node 116 may be connected to an instruction processor 168 by a connection 172. The client 160 may be any business, group, individual, or entity that desires to send directions over a distance. The instruction processor 168 may be any business, group, individual, or entity that is meant to receive or act upon those instructions. In some embodiments, the connections 164 and 172 may be unnecessary as the client may send the data to be transmitted directly from the communication node 112 or the communication node 116 may be connected directly to the instruction processor 168. The system 100 may be used for any kind of low-latency data transmission that is desired. As one example, the client 160 may be a doctor or surgeon working remotely while the instruction processor 168 may be a robotic instrument for working on a patient.

In some embodiments, the client 160 may be a financial instrument trader and the instruction processor 168 may be a stock exchange. The trader may wish to provide instructions to the stock exchange to buy or sell certain securities or bonds at specific times. The trader may transmit the instructions to the first communication node 112 which sends the instructions to second communication node using the antennae 128, 132 or by the transmission line 144. The stock exchange can then process the actions desired by the trader upon receipt of the instructions.

The system 100 may be useful for high-frequency trading, where trading strategies are carried out on computers to execute trades in fractions of a second. In high-frequency trading, a delay of mere milliseconds may cost a trader millions of dollars; therefore, the speed of transmission of trading instructions is as important as the accuracy of the data transmitted. In some embodiments, the trader may transmit preset trading instructions or conditions for executing a trade to the communication node 116, which is located within close proximity to a stock exchange, using the high latency, high bandwidth communication link 108 at a time before the trader wishes to execute a trade. These instructions or conditions may require the transmission of a large amount of data, and may be delivered more accurately using the higher bandwidth communication link 108. Also, if the instructions or conditions are sent at a time prior to when a trade is wished to be executed, the higher latency of the communication link 108 can be tolerated.

The eventual execution of the instructions may be accomplished by the trader transmitting triggering data to the system on which the instructions are stored. Upon receipt of the triggering data, the trading instructions are sent to the stock exchange and a trade is executed. The triggering data that is transmitted is generally a much smaller amount of data than the instructions; therefore, the triggering data may be sent over the low latency, low bandwidth communication link 104. When the triggering data is received at communication node 116, the instructions for a specific trade are sent to the stock exchange. Sending the triggering data over the low latency communication link 104 rather than the high latency communication link 108 allows the desired trade to be executed as quickly as possible, giving the trader a time advantage over other parties trading the same financial instruments.

Figure 2:
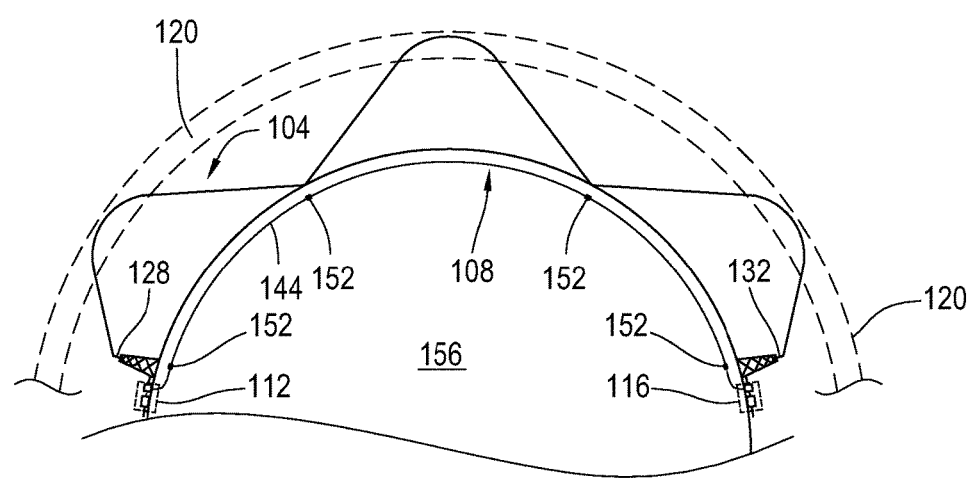
FIG. 2 is a schematic diagram further illustrating the skywave propagation of FIG. 1

The configuration shown in FIG. 1 is further illustrated in FIG. 2 where the first communication node 112 and the second communication node 116 are geographically remote from one another separated by a substantial portion of the surface of the earth (156). This portion of the earth's surface may include one or more continents, oceans, mountain ranges, or other geographic areas. For example, the distance spanned in FIGS. 1-7 may cover a single continent, multiple continents, an ocean, and the like. In one example, the first communication node 112 is in Chicago, Ill. in the United States of America, and the second communication node 116 is in London, England, in the United Kingdom. In another example, the first communication node 112 is in New York City, N.Y., and second communication node 116 is in Los Angeles, Calif., both cities being in North America. Any suitable combination of distance, communication nodes, and communications links is envisioned that can provide satisfactory latency and bandwidth.

FIG. 2 illustrates that skywave propagation allows electromagnetic energy to traverse long distances. Using skywave propagation, the low latency communication link 104 transmits the electromagnetic waves 124 into a portion of the atmosphere 120 that is sufficiently ionized to refract the electromagnetic waves 124 toward the earth. The waves may then be reflected by the surface of the earth and returned to the ionized portion of the upper atmosphere 120 where they may be refracted toward earth again. Thus electromagnetic energy may "skip" repeatedly allowing the low latency, low bandwidth signals 124 to cover distances substantially greater than those which may be covered by non-skywave propagation.

Figure 3:
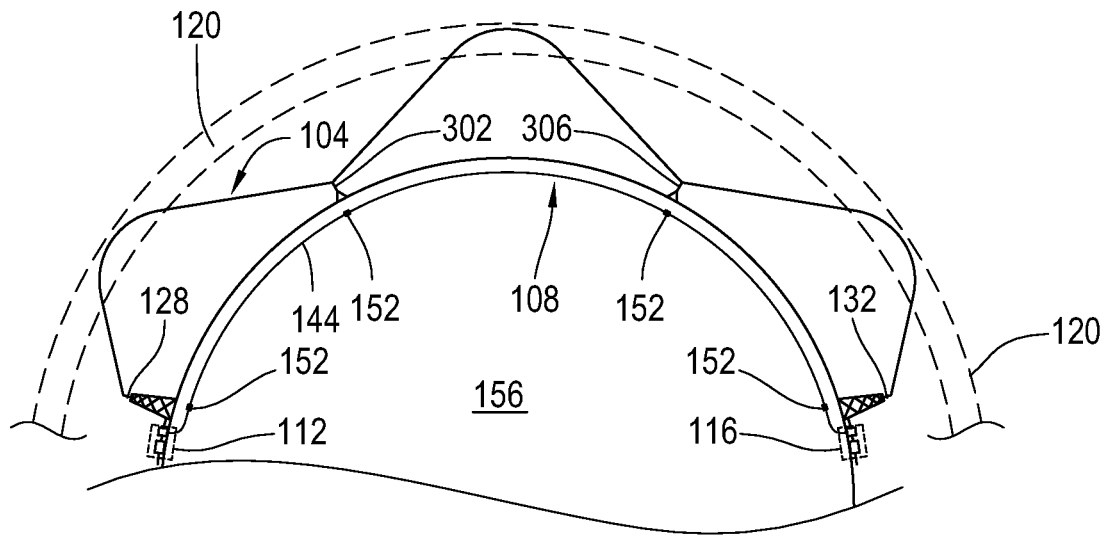
FIG. 3 is a schematic diagram illustrating the use of ground-based repeaters in the skywave propagation of FIG. 1.

Another example of the system illustrated in FIG. 1 appears in FIG. 3 where the skywave propagation discussed with respect to FIGS. 1 and 2 may be enhanced using repeaters 302 and 306. In this example, the first repeater 302 may receive the low latency communication signals emanating from the antenna 128. The signals may be refracted by the ionized region 120 and returned to earth where they may be received by the repeater 302 and retransmitted via skywave propagation. The refracted signal may be received by the repeater 306 and retransmitted using skywave propagation to the second communications node 116 via the antenna 132. Although two repeating stations are illustrated in FIG. 3, any suitable number, configuration, or positioning of the ground repeating stations 302 is considered. Increasing the number of repeaters 302, 306 may provide for the opportunity to transmit low latency signals over greater distances in a wider array of atmospheric missions, however, the physical limitations of the repeater circuitry that receives and retransmits the signal may add additional latency to low latency communication link 104.

Figure 4:
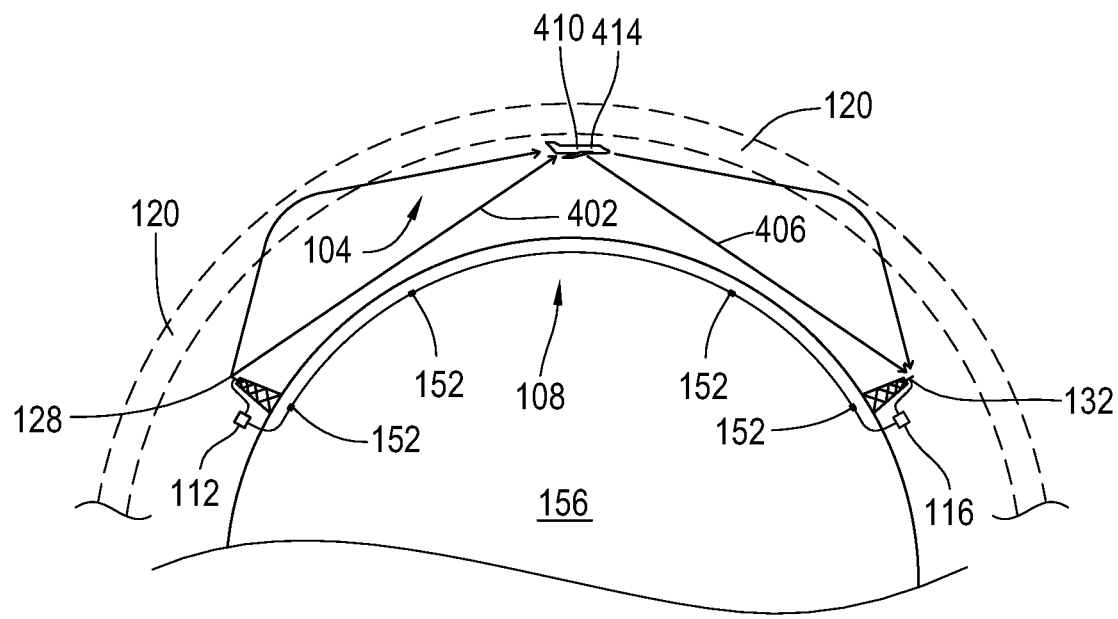
FIG. 4 is a schematic diagram illustrating the use of airborne repeaters in the skywave propagation of FIG. 1.

FIG. 4 illustrates another example of the system illustrated in FIG. 1 where one or more repeaters along the first communications link are airborne, such as in an aircraft, dirigible, balloon, or other device 410 configured to maintain the repeater aloft in the atmosphere. In this example, signals transmitted from the first communications node 112 via the antenna 128 may be received by an airborne repeater 414 either as line of sight communication 402, or by skywave propagation as described herein elsewhere. The signals may be received by the airborne repeater 414 and retransmitted as line of sight communication 406, or by skywave propagation to the second communications node 116 along the low latency link 104.

Figure 5:
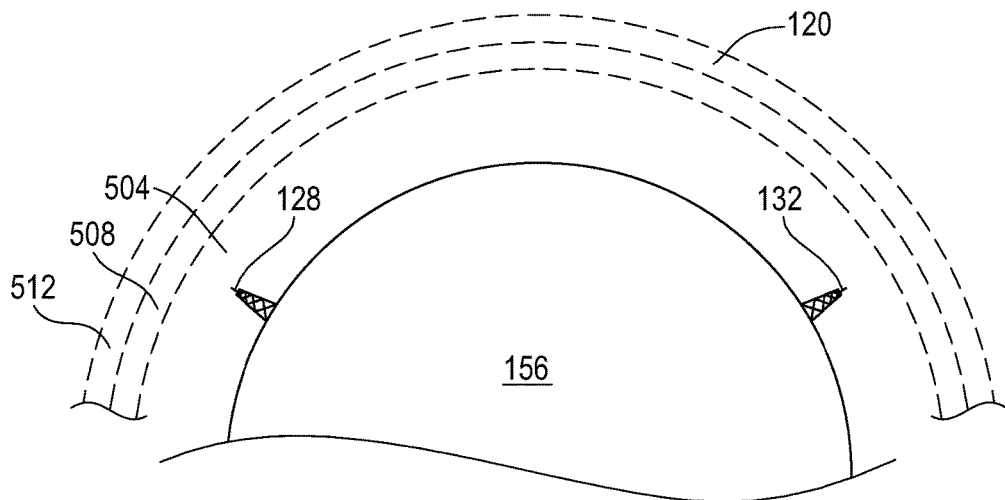
FIG. 5 is a schematic diagram illustrating additional layers of the atmosphere including the ionized layer shown in FIG. 1.
Figure 6:
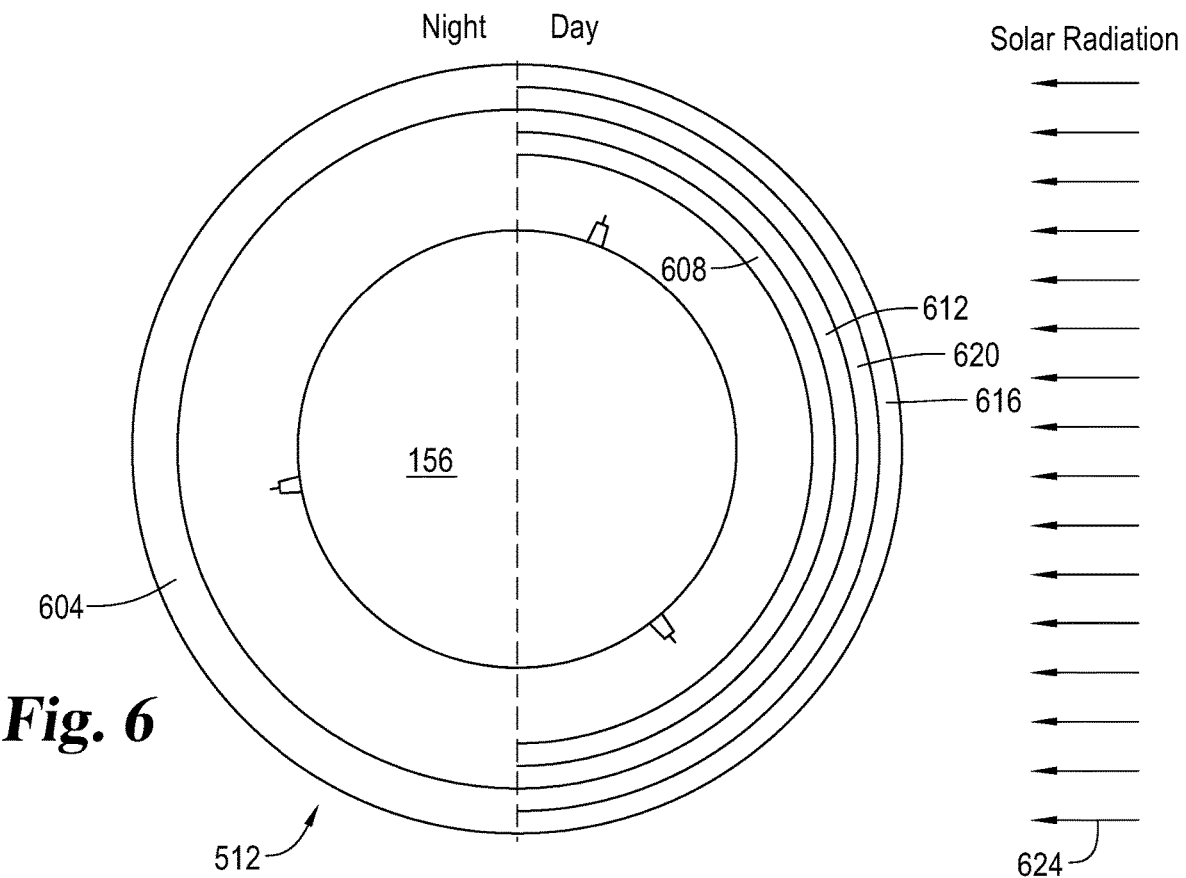
FIG. 6 is a schematic diagram illustrating various ionized layers of the atmosphere shown in FIG. 5.
Figure 7:
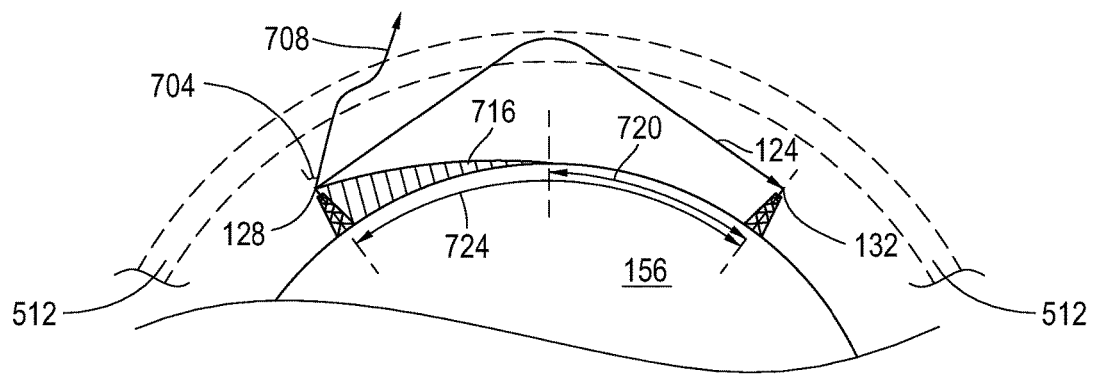
FIG. 7 is a schematic diagram illustrating additional details of skywave propagation generally illustrated in FIGS. 1-6.

Additional details regarding skywave propagation are illustrated in FIGS. 5-7. The relation to the system disclosed and various layers of the upper atmosphere is illustrated in FIG. 5. For purposes of radio transmission, the layers of the upper atmosphere may be divided as shown into successively higher layers such as the troposphere 504, the stratosphere 508, and the ionosphere 512.

The ionosphere is named as such because it includes a high concentration of ionized particles. The density of these particles in the ionosphere furthest from earth is very low and becomes progressively higher in the areas of the ionosphere closer to earth. The upper region of the ionosphere is energized by powerful electromagnetic radiation from the sun which includes high-energy ultraviolet radiation. This solar radiation causes ionization of the air into free electrons, positive ions, and negative ions. Even though the density of the air molecules in the upper ionosphere is low, the radiation particles from space are of such high energy that they cause extensive ionization of the relatively few air molecules that are present. The ionization extends down through the ionosphere with diminishing intensity as air becomes denser with the highest degree of ionization thus occurring at the upper extremities of the ionosphere, while the lowest degree occurs in the lower portion of the ionosphere.

These differences in ionization between the upper and lower extremities of the ionosphere 512 are further illustrated in FIG. 6. The ionosphere is illustrated in FIG. 6 with three layers designated, respectively, from lowest level to highest level as D layer 608, E layer 612, and F layer 604. The F layer 604 may be further divided into two layers designated F1 (the higher layer) at 616 and F2 (the lower layer) at 620. The presence or absence of layers 616 and 620 in the ionosphere and their height above the earth vary with the position of the sun. At high noon, radiation from the sun 624 passing into the ionosphere is greatest, tapering off at sunset and at a minimum at night. When the radiation is removed, many of the ions recombine causing the D layer 608 and the E layer 612 to disappear, and further causing the F1 and F2 layers 616, 620 to recombine into a single F layer 604 during the night. Since the position of the sun varies with respect to a given point on earth, the exact characteristics of the layers 608, 612, 616, and 620 of the ionosphere 512 can be extremely difficult to predict but may be determined by experimentation.

The ability for a radio wave to reach a remote location using skywave propagation depends on various factors such as ion density in the layers 608-620 (when they are present), the frequency of the transmitted electromagnetic energy, and the angle of transmission. For example, if the frequency of a radio wave is gradually increased, a point will be reached where the wave cannot be refracted by the D layer 608 which is the least ionized layer of the ionosphere 512. The wave may continue through the D layer 608 and into the E layer 612 where its frequency may still be too great to refract the singles passing through this layer as well. The waves 124 may continue to the F2 layer 620 and possibly into the F1 layer 616 as well before they are bent toward earth. In some cases, the frequency may be above a critical frequency making it impossible for any refraction to occur causing the electromagnetic energy to be radiated out of the earth's atmosphere (708).

Thus, above a certain frequency, electromagnetic energy transmitted vertically continues into space and is not refracted by the ionosphere 512. However, some waves below the critical frequency may be refracted if the angle of propagation 704 is lowered from the vertical. Lowering the angle of propagation 704 also allows the electromagnetic waves 124 transmitted by the antenna 128 to be refracted toward Earth's surface within a skip zone 720 making it possible to traverse a skip distance 724 and reach a remote antenna 132. Thus the opportunity for successful skywave propagation over a certain skip distance 724 is further dependent on the angle of transmission as well as the frequency, and therefore the maximum usable frequency varies with the condition of the ionosphere, desired skip distance 724, and the propagation angle 704. FIG. 7 also illustrates that non-skywave propagation such as groundwave signals and/or line of sight signals 716 are unlikely to traverse the skip distance 724.

Figure 8:
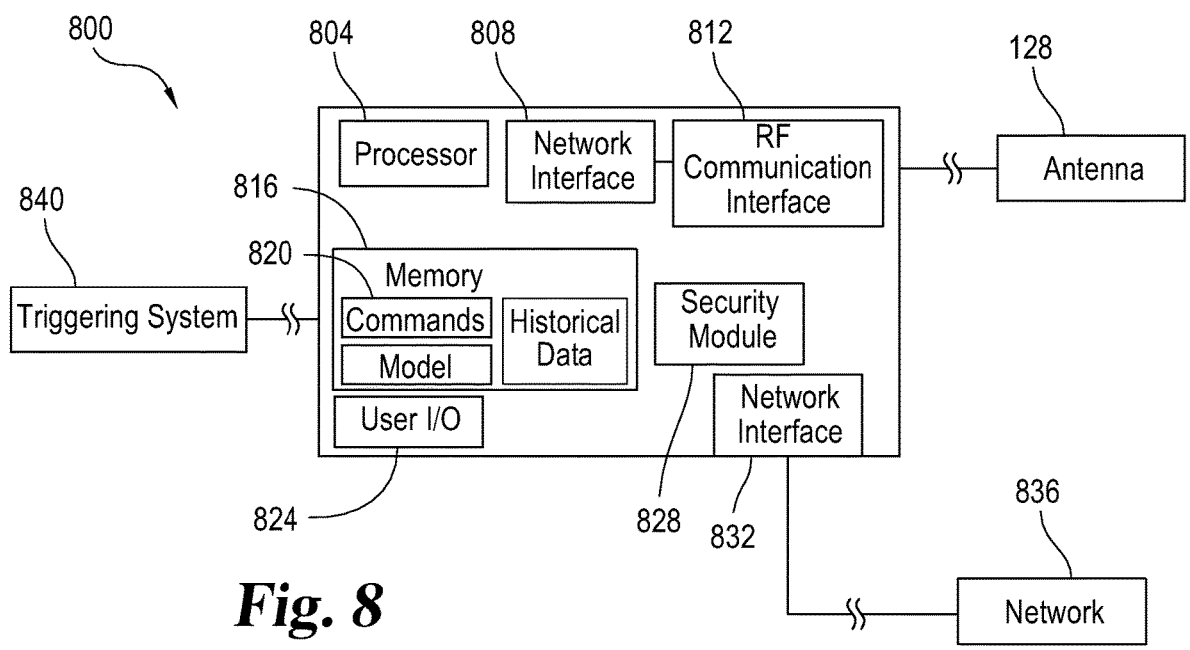
FIG. 8 is a schematic diagram illustrating additional detail for the communication nodes of FIG. 1.

FIG. 8 illustrates one example of additional aspects of a communication node 800 which is like the communication nodes 112 and 116. The communication node 800 can include a processor 804 for controlling various aspects of communication node 800. The processor may be coupled to a memory 816 useful for storing rules, command data 820, or historical transmission data 822. Devices for accepting user input and providing output (I/O) to a user 824 may also be included. These devices may include a keyboard or keypad, a mouse, a display such as a flat panel monitor and the like, a printer, plotter, or 3D printer, a camera, or a microphone. Any suitable devices for user I/O may be included. Node 800 may also include a network interface 832 responsive to the processor 804 and coupled to a communication network 836. A security module 828 may be included as well and may be used to reduce or eliminate the opportunity for third-parties to intercept, jam, or change data as it passes between the communications nodes 800. In one example, the communication node 800 is implemented as a computer executing software to control the interaction of the various aspects of the node 800.

The network interface 836 may be configured to send and receive data such as command data 820, or triggering data which may be passed from a triggering system 840. The communication network 836 may be coupled to a network such as the internet and configured to send and receive data without the use of skywave propagation. For example, the communication network 836 may transmit and receive data over optical fibers or other transmission lines running along the earth similar to the transmission lines 144 illustrated in previous figures.

The node 800 may include a second network interface 808 responsive to the processor 804 and coupled to a radio-frequency communication interface 812. This second network interface 808 may be used to transfer data such as command data 820 or triggering data passed from the triggering system 840. The network interface 808 may be coupled to an antenna like antenna 128 which may include multiple antennas or antenna elements. The radio-frequency communication interface 808 may be configured to send and receive data such as triggering data using electromagnetic waves transmitted and/or received via the antenna 128. As discussed above, the antenna 128 may be configured to send and receive the electromagnetic waves via skywave propagation.

Figure 9:
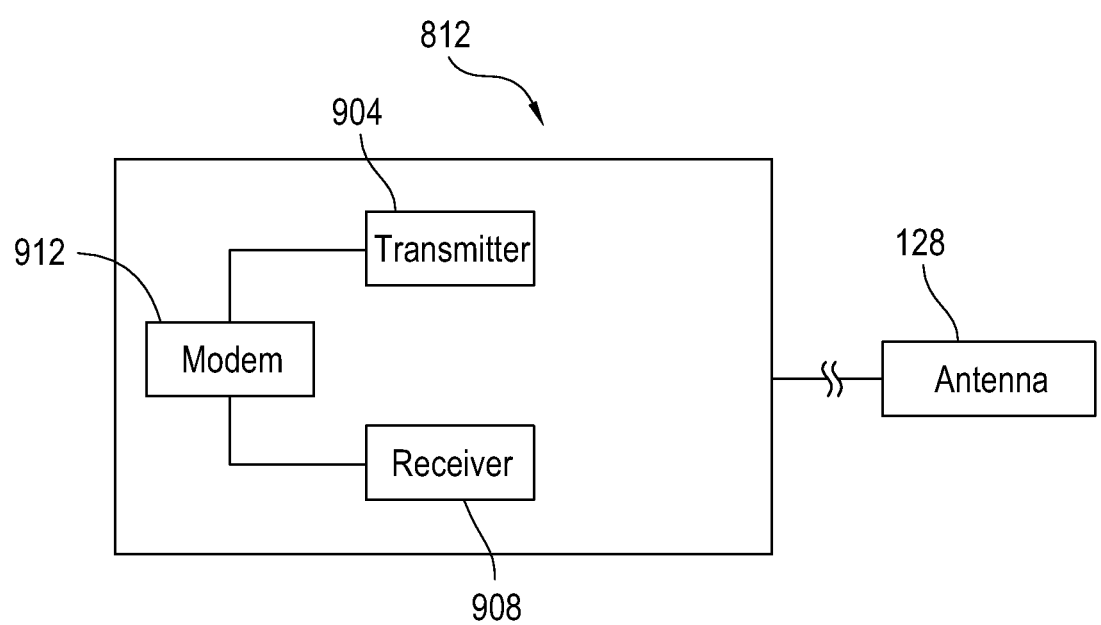
FIG. 9 is a schematic diagram illustrating additional detail for the RF communication interface in FIG. 8.

The communication node 800 may include additional aspects illustrated in FIG. 9. The radio-frequency communication interface 812 may include a transmitter 904 configured to transmit electromagnetic energy using the antenna 128. A receiver 908 may optionally be included as well and configured to receive electromagnetic waves from the antenna 128. The transmitter 904 and the receiver 908 may also be coupled to a modem 912 configured to modulate signals received by the interface 812 to encode information or data from a digital stream for transmission by transmitter 904. The modem 912 may also be configured to demodulate signals received by the receiver 908 from the antenna 128 to decode the transmitted signal into a digital data stream usable by the processor 804 or that may be stored in the memory 816.

In some embodiments, data transmission for purposes such as financial trading may only be needed for a limited period of time. The communication system 100 may operate in two different modes depending on whether financial data transmission is needed. If data transmission is necessary, the transmitter may operate in a data transmission mode. In data transmission mode, the communication system 100 transmits a digital data transmission signal from the first communication node 112 to the second communication node 116. When data transmission is not required, the system may operate in a broadcast mode. During broadcast mode, the transmitter may be used to broadcast music, sports, news, or other audio information to the general public, such as via an AM, FM, and/or PM signal. While the communication system 100 is operated in broadcast mode, it may broadcast in a digital form. For the purposes for explanation, the broadcast mode for the communication system will be described with reference to an AM signal, but it should be appreciated that AM, FM, and/or PM (or the like) can be used during the broadcast mode.

As a specific example, the communication system 100 may be used for transmitting instructions for financial transactions such as buying and selling stocks or bonds. This information would only be necessary during the hours that the desired stock exchanges are open. During off hours, when the stock exchanges are closed, the communication system 100 may be operated as a typical radio station, for example via an AM signal, providing content that may be heard by the general public.

Typically, when data is transmitted using a digital signal, clock synchronization is needed between the transmitter and the receiver. Because the path length of the transmitted data signal may change depending on the ionospheric conditions and other environmental conditions, resulting in signal distortion such as Doppler shifting. In order to adjust for or remove these distortions, the transmitted data signal may include a clock signal that provides information to the receiver regarding the transmission time of the data signal and possible distortion. In some embodiments, the clock for the transmitter and the clock for the receiver may be set at least in part based on time data received from a Global Positioning System (GPS). However, other sources of time data other than GPS may be included in the transmitted data signal.

One source that may interrupt the clock synchronization between a transmitter and a receiver is the need for station identification (ID). The FCC requires broadcast stations to provide station identification upon sign on, sign off, and near the top of every hour. The station is required to provide its call letters, city of license, and may include additional information such as transmission frequencies and ownership. Typically, station identification is transmitted using an analog signal, such as an AM broadcast signal. Therefore, in order to provide identification, the receiver switches from a digital signal to an AM signal. During the switch to the AM signal, the clock synchronization signal provided on the digital signal is lost. Once the receiver is switched back to the digital signal, there may be a delay as clock synchronization is reestablished between the transmitter and the receiver. This can cause processing delays within the transmitter and/or the receiver.

While the communication system 100 is in broadcast mode, the need for station identification does not present an issue, as the signal is already being broadcast as an AM signal, and any delay is not a concern. However, when the communication system 100 is operated in the digital data transmission mode, the switch from digital transmission to AM transmission to provide station identification may cause the transmitter and receiver to lose clock synchronization and there may be a delay as synchronization is reestablished. The delay caused by synchronization may be problematic depending on the nature of the digital data transmitted by the communication system 100 while in data transmission mode. For example, when the communication system 100 is used for transmission of financial trading data, the data may be extremely time sensitive and any delay may cost a client millions of dollars.

Figure 10:
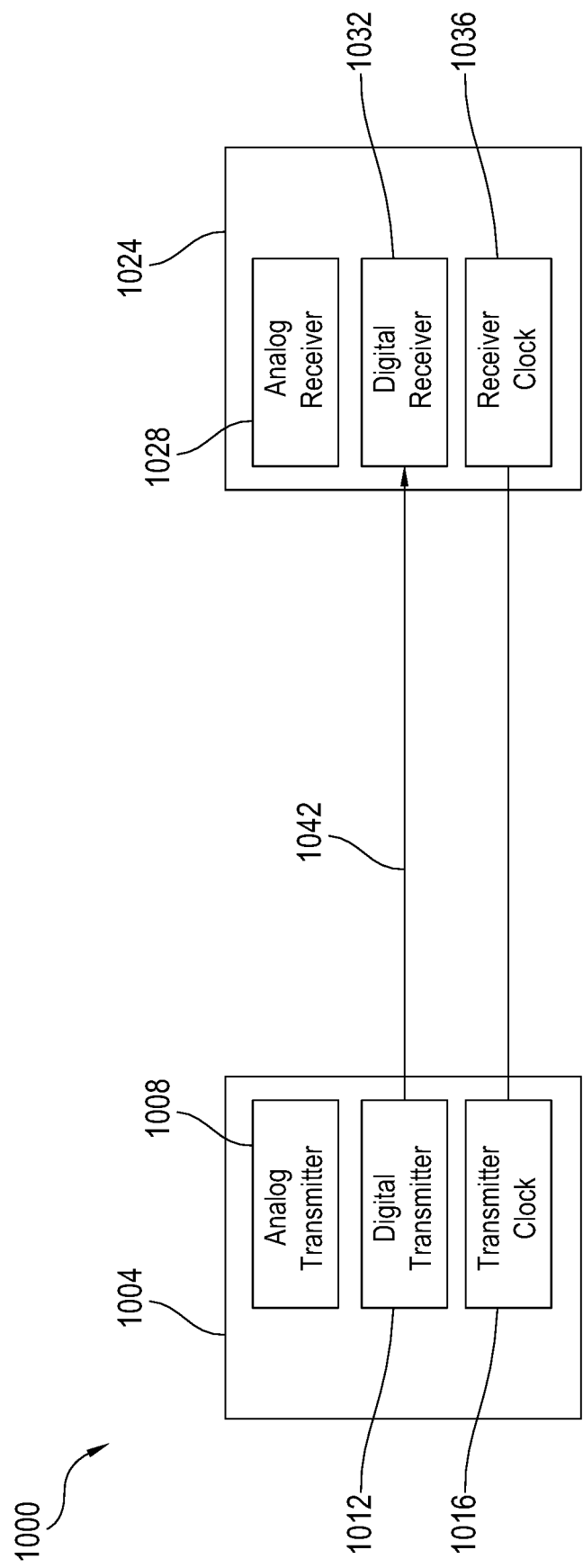
FIG. 10 is a schematic diagram of the transmission of a digital signal between a transmitter and a receiver.
Figure 11:
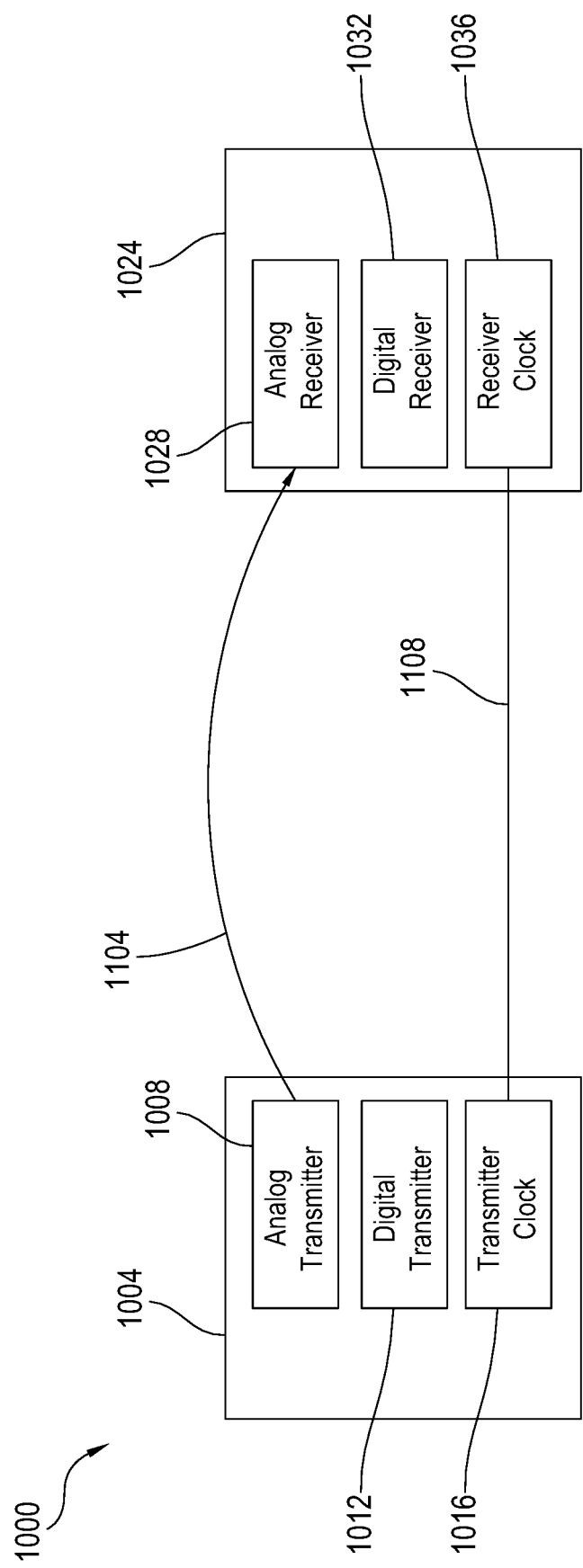
FIG. 11 is a schematic diagram of the transmission of an analog signal and a clock synchronization signal between the transmitter and the receiver of FIG. 10.
Figure 12:
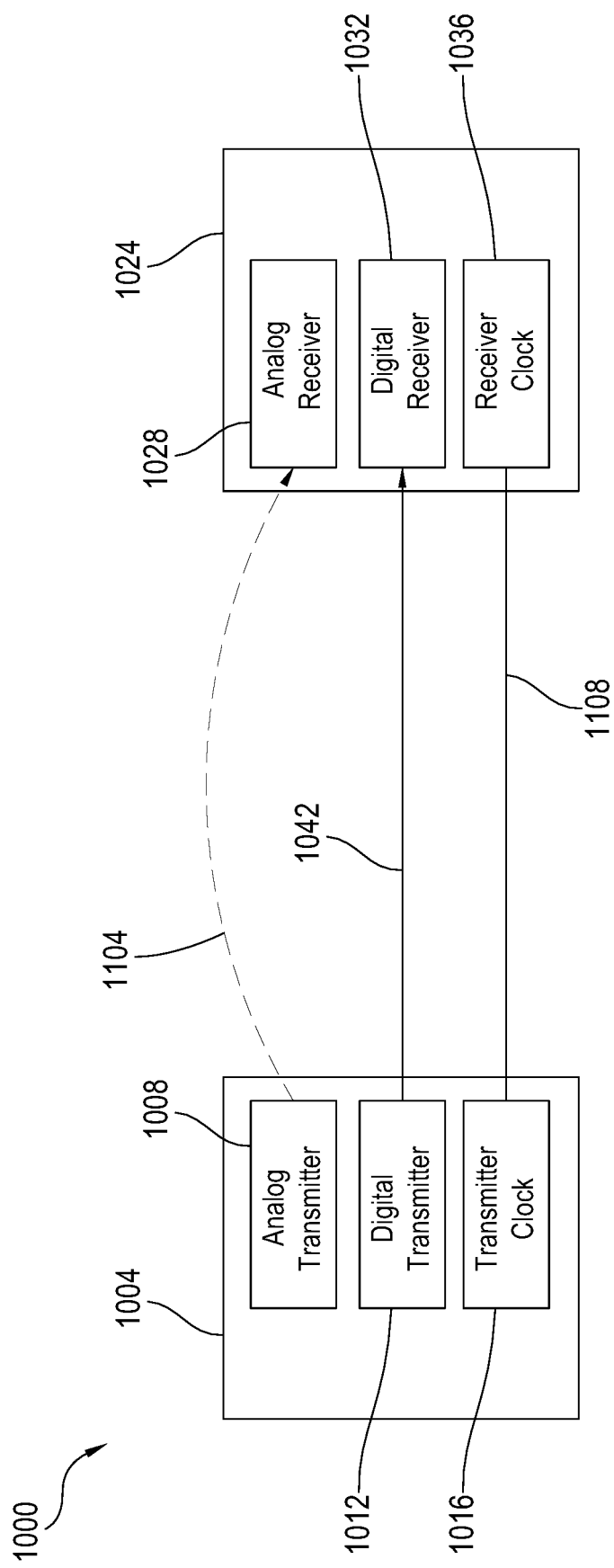
FIG. 12 is a schematic diagram of switching from the transmission of an analog signal to a digital signal between the transmitter and the receiver of FIG. 10.

A system 1000 for reducing latency due to clock synchronization is shown in FIGS. 10-12. In FIG. 10, a transmitter 1004 includes an analog transmitter 1008, a digital transmitter 1012, and a transmitter clock 1016. A receiver 1024 includes an analog receiver 1028, a digital receiver 1032, and a receiver clock 1036. When transmitter 1004 is sending digital data to receiver 1024, the digital transmitter 1012 transmits a digital signal 1042 to the digital receiver 1032. It is common for data transmitted using a digital signal to require clock synchronization between the transmitter clock 1016 and the receiver clock 1036 by using a signal transmitted with the digital data or by using other signals such as time data received from a GPS.

At times, it may be necessary to switch from digital transmission to analog transmission, such as when station identification is required. As shown in FIG. 11, when analog transmission is desired, the digital transmission is stopped and an analog signal 1104 is sent from the analog transmitter 1008 to the analog receiver 1028. In some typical communication systems, clock synchronization between the transmitter clock 1016 and the receiver clock 1036 may be lost during analog transmission. However, in system 1000, a clock synchronization signal 1108 may be transmitted with the analog signal 1104 to maintain synchronization between the transmitter clock 1016 and the receiver clock 1036. In one example, the clock synchronization signal 1108 is a digital low-bit rate signal, but clock synchronization signal 1108 in other examples can alternatively or additionally include high-bit rate signals and/or analog signals.

Once transmission of the analog signal 1104 has been completed, the system switches back to transmission of the digital signal 1042, as shown in FIG. 12. The clock synchronization signal 1108 maintains synchronization between the transmitter clock 1016 and the receiver 1036 during the switch between the analog signal 1104 and the digital signal 1042. Therefore, there is no delay to reestablish clock synchronization during the switch between analog and digital signals.

Figure 13:
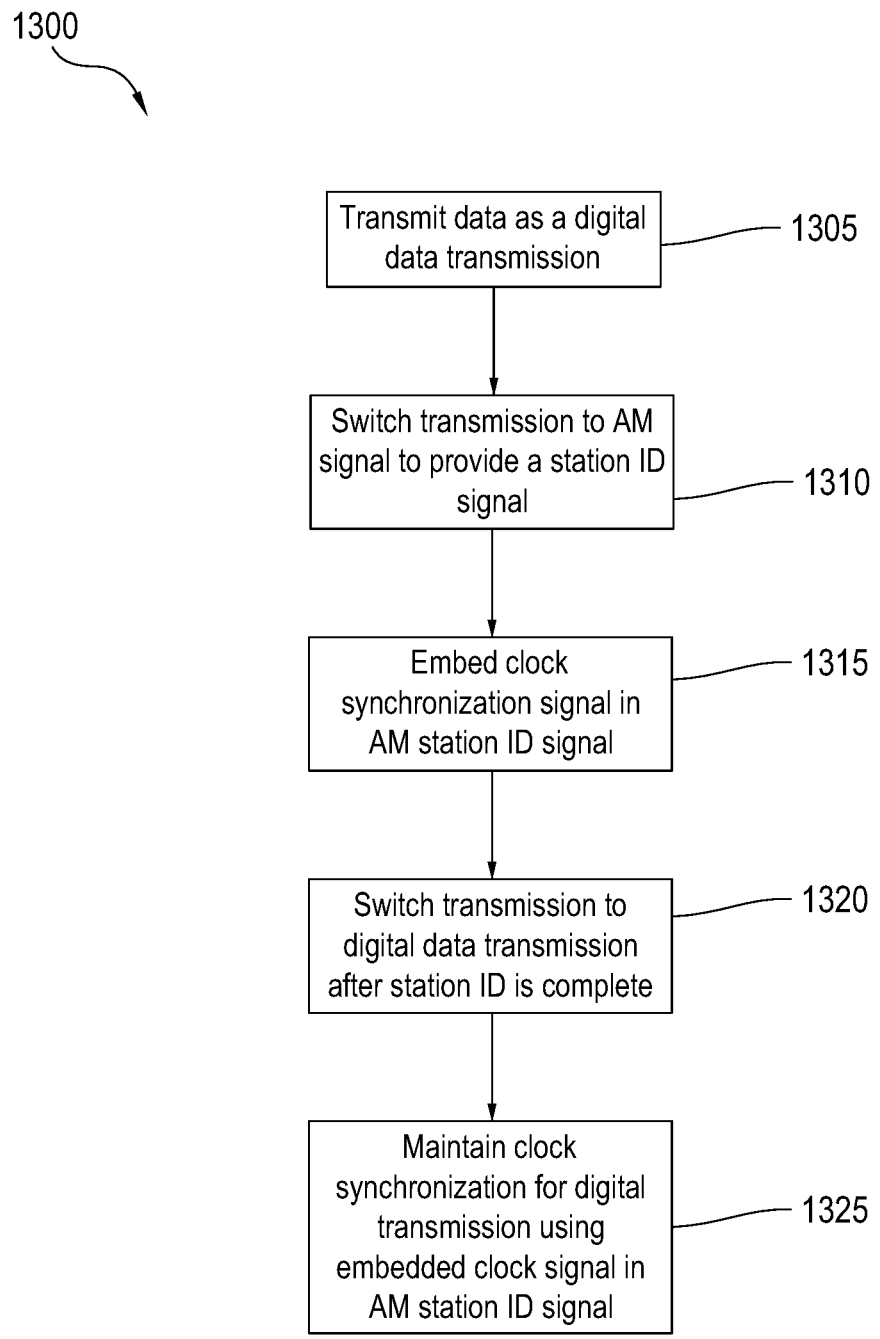
FIG. 13 is flowchart for a method for reducing latency due to clock synchronization.

The flowchart 1300 in FIG. 13 describes the method for reducing delays due to loss of clock synchronization. The communication system 100 transmits 1305 data as a digital data transmission from a transmitter to a receiver, such as from first communication node 112 to second communication node 116. At the specified times during the day, the transmission from first communication node 112 is switched 1310 from a digital data transmission to an AM station ID signal to provide station identification as required by law. A digital clock synchronization signal is embedded 1315 within the AM station ID signal and broadcast as the station identification is broadcast. After station identification is complete, the communication system 100 switches 1320 from transmission of the AM station ID signal to resume transmission of the digital data transmission. As the transmission is switched from the AM station ID signal to the digital data stream, clock synchronization is maintained 1025 due to the digital clock synchronization signal that was embedded in the AM station ID signal.

In some embodiments, the clock synchronization signal embedded in the AM station ID signal may be modulated using PM. However, the clock synchronization signal may be modulated in other ways such as via FM and/or AM. Also, in some embodiments, the clock synchronization signal may be embedded in the station ID signal so that the clock synchronization signal is broadcast during the entire station identification break. However, in other embodiments, the clock synchronization signal may be transmitted only during the portion of the station identification directly before reestablishment of the digital data transmission signal, so that clock synchronization is achieved before the transmission is switched from AM broadcast to digital transmission.

Clock synchronization may also be used as the communication system 100 switches from broadcast mode to data transmission mode. As the communication system 100 broadcasts to the general public, a digital clock synchronization signal may be transmitted along with the music, news, sports, or other form of audio information is broadcast to the public. The synchronization signal may be transmitted only in the time leading up to the switch to data transmission mode, or the clock synchronization signal may be transmitted for the entire time that the communication system 100 is operating in broadcast mode. Once the communication system 100 is switched from broadcast mode to data transmission mode, the clock synchronization signal allows the first communication node 112 and second communication node 116 to be immediately synchronized so that there is no or minimum delay caused by synchronization.

The embedded synchronization technique described above for maintaining clock synchronization or reestablishing clock synchronization to avoid a delay may also be used for other types of broadcasts that require low latency. For example, embedded clock synchronization may be used when switching from an analog signal, such as audio or an analog television signal to a digital signal.

GLOSSARY OF DEFINITIONS AND ALTERNATIVES

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.).

"Analog signal" generally refers to a continuous signal of a time-varying variable. An analog signal may be modulated using amplitude modulation (AM), frequency modulation (FM), or other forms of modulation, such as phase modulation.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff" angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Clock synchronization" generally refers to the coordination of time between otherwise independent clocks, computers, processors. transceivers, and/or other types of devices. For example, clock synchronization is used to compensate for clock drift between different clocks.

"Clock synchronization signal" generally refers to a signal that provides time data for synchronizing a transmitter and a receiver. The clock synchronization signal may be received from a Global Positioning System and/or may originate from some other public and/or private source.

"Command" or "Command Data" generally refers to one or more directives, instructions, algorithms, or rules controlling a machine to take one or more actions, alone or in combination. A command may be stored, transferred, transmitted, or otherwise processed in any suitable manner. For example, a command may be stored in a memory or transmitted over a communication network as electromagnetic radiation at any suitable frequency passing through any suitable medium.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 802.11a/b/g/n, 3G, 4G, and the like.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link figured to respond to one another by physical movement of one element in relation to another. In the case of an electrical link, the communication link may be composed of multiple electrical conductors electrically connected to form the communication link.

In the case of an electromagnetic link, elements the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station in the receiving station. Logical link may include any combination of physical, electrical, electromagnetic, or other types of communication links.

"Communication node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Critical angle" generally refers to the highest angle with respect to a vertical line extending to the center of the Earth at which an electromagnetic wave at a specific frequency can be returned to the Earth using sky-wave propagation.

"Critical Frequency" generally refers to the highest frequency that will be returned to the Earth when transmitted vertically under given ionospheric conditions using sky-wave propagation.

"Data Bandwidth" generally refers to the maximum throughput of a logical or physical communication path in a communication system. Data bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the data bandwidth of a given digital communications network. Data networks may be rated according to their data bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz.

Data bandwidth may also be characterized according to the maximum transfer rate for a particular communications network. For example:

"Low Data Bandwidth" generally refers to a communications network with a maximum data transfer rate that is less than or about equal to 1,000,000 units of data per second. For example, in a digital communications network, the unit of data is a bit. Therefore low data bandwidth digital communications networks are networks with a maximum transfer rate that is less than or about equal to 1,000,000 bits per second (1 Mbits/s).

"High Data Bandwidth" generally refers to a communications network with a maximum data transfer rate that is greater than about 1,000,000 units of data per second. For example, a digital communications network with a high data bandwidth is a digital communications network with a maximum transfer rate that is greater than about 1,000,000 bits per second (1 Mbits/s).

"Demodulator" generally refers to any device that decodes a modulated waveform or any another type carrier wave that has been transmitted. A demodulator may be used to allow decoding of either analog or digital signals.

"Digital signal" generally refers to a signal containing data that is transmitted using a sequence of discrete values.

"Electromagnet Radiation" generally refers to energy radiated by electromagnetic waves. Electromagnetic radiation is produced from other types of energy, and is converted to other types when it is destroyed. Electromagnetic radiation carries this energy as it travels moving away from its source at the speed of light (in a vacuum). Electromagnetic radiation also carries both momentum and angular momentum. These properties may all be imparted to matter with which the electromagnetic radiation interacts as it moves outwardly away from its source.

Electromagnetic radiation changes speed as it passes from one medium to another. When transitioning from one media to the next, the physical properties of the new medium can cause some or all of the radiated energy to be reflected while the remaining energy passes into the new medium. This occurs at every junction between media that electromagnetic radiation encounters as it travels.

The photon is the quantum of the electromagnetic interaction, and is the basic constituent of all forms of electromagnetic radiation. The quantum nature of light becomes more apparent at high frequencies as electromagnetic radiation behaves more like particles and less like waves as its frequency increases.

"Electromagnetic Spectrum" generally refers to the range of all possible frequencies of electromagnetic radiation. The electromagnetic spectrum is generally categorized as follows, in order of increasing frequency and energy and decreasing wavelength:

"Extremely low frequency" (ELF) generally designates a band of frequencies from about 3 to about 30 Hz with wavelengths from about 100,000 to 10,000 km long.

"Super low frequency" (SLF) generally designates a band of frequencies generally ranging between about 30 Hz to about 300 Hz with wavelengths of about 10,000 to about 1000 km long.

"Voice frequency" or "voice band" generally designates electromagnetic energy that is audible to the human ear. Adult males generally speak in the range between about 85 and about 180 Hz while adult females generally converse in the range from about 165 to about 255 Hz.

"Very low frequency" (VLF) generally designates the band of frequencies from about 3 kHz to about 30 kHz with corresponding wavelengths from about 10 to about 100 km long.

"Low-frequency" (LF) generally designates the band of frequencies in the range of about 30 kHz to about 300 kHz with wavelengths range from about 1 to about 10 km.

"Medium frequency" (MF) generally designates the band of frequencies from about 300 kHz to about 3 MHz with wavelengths from about 1000 to about 100 m long.

"High frequency" (HF) generally designates the band of frequencies from about 3 MHz to about 30 MHz having wavelengths from about 100 m to about 10 m long.

"Very high frequency" (VHF) generally designates the band of frequencies from about 30 Hz to about 300 MHz with wavelengths from about 10 m to about 1 m long.

"Ultra high frequency" (UHF) generally designates the band of frequencies from about 300 MHz to about 3 GHz with weight wavelengths ranging from about 1 m to about 10 cm long.

"Super high frequency" (SHF) generally designates the band of frequencies from about 3 GHz to about 30 GHz with wavelengths ranging from about 10 cm to about 1 cm long.

"Extremely high frequency" (EHF) generally designates the band of frequencies from about 30 GHz to about 300 GHz with wavelengths ranging from about 1 cm to about 1 mm long.

"Far infrared" (FIR) generally designates a band of frequencies from about 300 GHz to about 20 THz with wavelengths ranging from about 1 mm to about 15 µm long.

"Long-wavelength infrared" (LWIR) generally designates a band of frequencies from about 20 THz to about 37 THz with wavelengths ranging from about 15 µm to about 8 µm long.

"Mid infrared" (MIR) generally designates a band of frequencies from about 37 THz to about 100 THz with wavelengths from about 8 µm to about 3 µm long.

"Short wavelength infrared" (SWIR) generally designates a band of frequencies from about 100 THz to about 214 THz with wavelengths from about 3 µm to about 1.4 µm long.

"Near-infrared" (NIR) generally designates a band of frequencies from about 214 THz to about 400 THz with wavelengths from about 1.4 µm to about 750 nm long.

"Visible light" generally designates a band of frequencies from about 400 THz to about 750 THz with wavelengths from about 750 nm to about 400 nm long.

"Near ultraviolet" (NUV) generally designates a band of frequencies from about 750 THz to about 1 PHz with wavelengths from about 400 nm to about 300 nm long.

"Middle ultraviolet" (MUV) generally designates a band of frequencies from about 1 PHz to about 1.5 PHz with wavelengths from about 300 nm to about 200 nm long.

"Far ultraviolet" (FUV) generally designates a band of frequencies from about 1.5 PHz to about 2.48 PHz with wavelengths from about 200 nm to about 122 nm long.

"Extreme ultraviolet" (EUV) generally designates a band of frequencies from about 2.48 PHz to about 30 PHz with wavelengths from about 121 nm to about 10 nm long.

"Soft x-rays" (SX) generally designates a band of frequencies from about 30 PHz to about 3 EHz with wavelengths from about 10 nm to about 100 pm long.

"Hard x-rays" (HX) generally designates a band of frequencies from about 3 EHz to about 30 EHz with wavelengths from about 100 µm to about 10 pm long.

"Gamma rays" generally designates a band of frequencies above about 30 EHz with wavelengths less than about 10 pm long.

"Electromagnetic Waves" generally refers to waves having a separate electrical and a magnetic component. The electrical and magnetic components of an electromagnetic wave oscillate in phase and are always separated by a 90 degree angle. Electromagnetic waves can radiate from a source to create electromagnetic radiation capable of passing through a medium or through a vacuum. Electromagnetic waves include waves oscillating at any frequency in the electromagnetic spectrum including, but not limited to, radio waves, visible and invisible light, X-rays, and gamma-rays.

"Equalizer" generally refers to a device used to reduce distortion in a transmitted signal. An equalizer may reduce distortion based on time such as a group delay or may reduce distortion of signal frequency such as phase delay. An equalizer may also be used to reduce other types of distortion such as echoes, frequency selectivity, or frequency shift.

"Frequency Bandwidth" or "Band" generally refers to a contiguous range of frequencies defined by an upper and lower frequency. Frequency bandwidth is thus typically expressed as a number of hertz (cycles per second) representing the difference between the upper frequency and the lower frequency of the band and may or may not include the upper and lower frequencies themselves. A "band" can therefore be defined by a given frequency bandwidth for a given region and designated with generally agreed on terms. For example, the "20 meter band" in the United States is assigned the frequency range from 14 MHz to 14.35 MHz thus defining a frequency bandwidth of 0.35 MHz or 350 KHz. In another example, the International Telecommunication Union (ITU) has designated the frequency range from 300 Mhz to 3 GHz as the "UHF band".

"Fiber-optic communication" generally refers to a method of transmitting data from one place to another by sending pulses of electromagnetic energy through an optical fiber.

The transmitted energy may form an electromagnetic carrier wave that can be modulated to carry data. Fiber-optic communication lines that use optical fiber cables to transmit data can be configured to have a high data bandwidth. For example, fiber-optic communication lines may have a high data bandwidth of up to about 15 Tbit/s, about 25 Tbit/s, about 100 Tbit/s, about 1 Pbit/s or more. Opto-electronic repeaters may be used along a fiber-optic communication line to convert the electromagnetic energy from one segment of fiber-optic cable into an electrical signal. The repeater can retransmit the electrical signal as electromagnetic energy along another segment of fiber-optic cable at a higher signal strength than it was received.

"Financial instrument" generally refers to a tradable asset of any kind. General examples include, but are not limited to, cash, evidence of an ownership interest in an entity, or a contractual right to receive or deliver cash or another financial instrument. Specific examples include bonds, bills (e.g. commercial paper and treasury bills), stock, loans, deposits, certificates of deposit, bond futures or options on bond futures, short-term interest rate futures, stock options, equity futures, currency futures, interest rate swaps, interest rate caps and floors, interest rate options, forward rate agreements, stock options, foreign-exchange options, foreign-exchange swaps, currency swaps, or any sort of derivative.

"Fused data stream" generally refers to a combination of at least two or more separate data transmissions. The data transmissions may come from any desired source. For example, the data transmission may be in-band data, out-of-band data, public data, or private data. The fused data stream may be any desired combination of these different data transmissions.

"Ground" is used more in an electrical/electromagnetic sense and generally refers to the Earth's surface including land and bodies of water, such as oceans, lakes, and rivers.

"Ground-wave propagation" generally refers to a transmission method in which one or more electromagnetic waves are conducted via the boundary of the ground and atmosphere to travel along ground. The electromagnetic wave propagates by interacting with the semi-conductive surface of the earth. In essence, the wave clings to the surfaces so as to follow the curvature of the earth. Typically, but not always, the electromagnetic wave is in the form of a ground or surface wave formed by low-frequency radio waves.

"Identifier" generally refers to a name that identifies (that is, labels the identity of) either a unique thing or a unique class of things, where the "object" or class may be an idea, physical object (or class thereof), or physical substance (or class thereof). The abbreviation "ID" often refers to identity, identification (the process of identifying), or an identifier (that is, an instance of identification). An identifier may or may not include words, numbers, letters, symbols, shapes, colors, sounds, or any combination of those.

The words, numbers, letters, or symbols may follow an encoding system (wherein letters, digits, words, or symbols represent ideas or longer identifiers) or they may simply be arbitrary. When an identifier follows an encoding system, it is often referred to as a code or ID code. Identifiers that do not follow any encoding scheme are often said to be arbitrary IDs because they are arbitrarily assigned without meaning in any other context beyond identifying something.

"In-band data" generally refers to data that is collected from the main data transmission stream between two communication nodes. Typically, in-band data is the main data transmission sent by the transmitting party. This data may be collected and analyzed to determine the viability of transmitting data at a certain frequency at the ionospheric conditions during the time of transmission.

"Ionosphere" generally refers to the layer of the Earth's atmosphere that contains a high concentration of ions and free electrons and is able to reflect radio waves. The ionosphere includes the thermosphere as well as parts of the mesosphere and exosphere. The ionosphere extends from about 25 to about 600 miles (about 40 to 1,000 km) above the earth's surface. The ionosphere includes a number of layers that undergo considerable variations in altitude, density, and thickness, depending among a number of factors including solar activity, such as sunspots. The various layers of the ionosphere are identified below.

The "D layer" of the ionosphere is the innermost layer that ranges from about 25 miles (40 km) to about 55 miles (90 km) above the Earth's surface. The layer has the ability to refract signals of low frequencies, but it allows high frequency radio signals to pass through with some attenuation. The D layer normally, but not in all instances, disappears rapidly after sunset due to rapid recombination of its ions.

The "E layer" of the ionosphere is the middle layer that ranges from about 55 miles (90 km) to about 90 miles (145 km) above the Earth's surface. The E layer typically has the ability to refract signals with frequencies higher than the D layer. Depending on the conditions, the E layer can normally refract frequencies up to 20 MHz. The rate of ionic recombination in the E layer is somewhat rapid such that after sunset it almost completely disappears by midnight. The E layer can further include what is termed an "$E_s$-layer" or "sporadic E layer" that is formed by small, thin clouds of intense ionization. The sporadic E layer can reflect radio waves, even frequencies up to 225 MHz, although rarely. Sporadic E layers most often form during summer months, and it has skip distances of around 1,020 miles (1,640 km). With the sporadic E layer, one hop propagation can be about 560 miles (900 km) to up to 1,600 miles (2,500 km), and double hop propagation can be over 2,200 miles (3,500 km).

The "F layer" of the ionosphere is the top layer that ranges from about 90 (145 km) to 310 miles (500 km) or more above the Earth's surface. The ionization in the F layer is typically quite high and varies widely during the day, with the highest ionization occurring usually around noon. During daylight, the F layer separates into two layers, the $F_1$ layer and the $F_2$ layer. The $F_2$ layer is outermost layer and, as such, is located higher than the $F_1$ layer. Given the atmosphere is rarified at these altitudes, the recombination of ions occur slowly such that F layer remains constantly ionized, either day or night such that most (but not all) skywave propagation of radio waves occur in the F layer, thereby facilitating high frequency (HF) or short wave communication over long distances. For example, the F layers are able to refract high frequency, long distance transmissions for frequencies up to 30 MHz.

"Latency" generally refers to the time interval between a cause and an effect in a system. Latency is physically a consequence of the limited velocity with which any physical interaction can propagate throughout a system. Latency is physically a consequence of the limited velocity with which any physical interaction can propagate. The speed at which an effect can propagate through a system is always lower than or equal to the speed of light. Therefore every physical system that includes some distance between the cause and the effect will experience some kind of latency. For example, in a communication link or communications network, latency generally refers to the minimum time it takes for data to pass from one point to another. Latency with respect to communications networks may also be characterized as the time it takes energy to move from one point along the network to another. With respect to delays caused by the propagation of electromagnetic energy following a particular propagation path, latency can be categorized as follows:

"Low Latency" generally refers to a period of time that is less than or about equal to a propagation time that is 10% greater than the time required for light to travel a given propagation path in a vacuum. Expressed as a formula, low latency is defined as follows:

$$latency_{low} \leq \frac{d}{c} \cdot k \quad \text{(Equation 1)}$$

where:
d=distance (miles)
c=the speed of light in a vacuum (186,000 miles/sec)
k=a scalar constant of 1.1

For example, light can travel 25,000 miles through a vacuum in about 0.1344 seconds. A "low latency" communication link carrying data over this 25,000 mile propagation path would therefore be capable of passing at least some portion of the data over the link in about 0.14784 seconds or less.

"High Latency" generally refers to a period of time that is over 10% greater than the time required for light to travel a given propagation path in a vacuum. Expressed as a formula, high latency is defined as follows:

$$latency_{high} > \frac{d}{c} \cdot k \quad \text{(Equation 2)}$$

where:
d=distance (miles)
c=the speed of light in a vacuum (186,000 miles/sec)
k=a scalar constant of 1.1

For example, light can travel 8,000 miles through a vacuum in about 0.04301 seconds. A "high latency" communication link carrying data over this transmission path would therefore be capable of passing at least some portion of the data over the link in about 0.04731 seconds or more.

The "high" and "low" latency of a network may be independent of the data bandwidth. Some "high" latency networks may have a high transfer rate that is higher than a "low" latency network, but this may not always be the case. Some "low" latency networks may have a data bandwidth that exceeds the bandwidth of a "high" latency network.

"Maximum Usable Frequency (MUF)" generally refers to the highest frequency that is returned to the Earth using sky-wave propagation.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Modulation" generally refers to a process of varying one or more properties of a periodic waveform, called a carrier signal, with a modulating signal that represents information to be transmitted. Common examples of modulation techniques include, but are not limited to, Frequency Modulation (FM), Amplitude Modulation (AM), Phase—Shift Keying (PSK), Frequency Shift Keying (FSK), Amplitude Shift Keying (Ask), off Keying (Oh Okay) Quadrature Amplitude Modulation (QAM), Continuous Phase Modulation (CPM), Orthogonal Frequency Division Multiplexing (OFD M), Wavelet Modulation, Trellis Coded Modulation (TCM), Direct Sequence Spread Spectrum (DSSS), Troop Spread Spectrum (CSS), and Frequency Hopping Spread Spectrum (FHSS).

"Modulator" generally refers to a device that is configured or adapted to perform modulation. One example of such a device is a "modem" which can perform both modulation and demodulation.

"Non-sky-wave propagation" generally refers to all forms of transmission, wired and/or wireless, in which the information is not transmitted by reflecting an electromagnetic wave from the ionosphere.

"Optimum Working Frequency" generally refers to the frequency that provides the most consistent communication path via sky-wave propagation. It can vary over time depending on number of factors, such as ionospheric conditions and time of day. For transmissions using the F2 layer of the ionosphere the working frequency is generally around 85% of the MUF, and for the E layer, the optimum working frequency will generally be near the MUF.

"Optical Fiber" generally refers to an electromagnetic waveguide having an elongate conduit that includes a substantially transparent medium through which electromagnetic energy travels as it traverses the long axis of the conduit. Electromagnetic radiation may be maintained within the conduit by total internal reflection of the electromagnetic radiation as it traverses the conduit. Total internal reflection is generally achieved using optical fibers that include a substantially transparent core surrounded by a second substantially transparent cladding material with a lower index of refraction than the core.

Optical fibers are generally constructed of dielectric material that is not electrically conductive but is substantially transparent. Such materials may or may not include any combination of extruded glass such as silica, fluoride glass, phosphate glass, Chalcogenide glass, or polymeric material such as various types of plastic, or other suitable material and may be configured with any suitable cross-sectional shape, length, or dimension. Examples of electromagnetic energy that may be successfully passed through optical fibers include electromagnetic waves in the near-infrared, mid-infrared, and visible light portion of the electromagnetic spectrum, although electromagnetic energy of any suitable frequency may be used.

"Out-of-band data" generally refers to data that is collected from a channel that is independent of the channel through which the main data stream is transmitted. The out-of-band data may be data streams sent by skywave propagation by third parties or may be data streams sent by the transmitting party along a different channel than the main data transmission stream. The data collected may include ionospheric data, for example from an ionosonde, or may be general data that is collected and analyzed to determine the viability of transmitting data at a certain frequency at the current ionospheric conditions.

"Polarization" generally refers to the orientation of the electric field ("E-plane") of a radiated electromagnetic energy wave with respect to the Earth's surface and is determined by the physical structure and orientation of the radiating antenna. Polarization can be considered separately from an antenna's directionality. Thus, a simple straight wire antenna may have one polarization when mounted abstention the vertically, and a different polarization when mounted substantially horizontally. As a transverse wave, the magnetic field of a radio wave is at right angles to that of the electric field, but by convention, talk of an antenna's "polarization" is understood to refer to the direction of the electric field.

Reflections generally affect polarization. For radio waves, one important reflector is the ionosphere which can change the wave's polarization. Thus for signals received via reflection by the ionosphere (a skywave), a consistent polarization cannot be expected. For line-of-sight communications or ground wave propagation, horizontally or vertically polarized transmissions generally remain in about the same polarization state at the receiving location. Matching the receiving antenna's polarization to that of the transmitter may be especially important in ground wave or line of sight propagation but may be less important in skywave propagation.

An antenna's linear polarization is generally along the direction (as viewed from the receiving location) of the antenna's currents when such a direction can be defined. For instance, a vertical whip antenna or Wi-Fi antenna vertically oriented will transmit and receive in the vertical polarization. Antennas with horizontal elements, such as most rooftop TV antennas, are generally horizontally polarized (because broadcast TV usually uses horizontal polarization). Even when the antenna system has a vertical orientation, such as an array of horizontal dipole antennas, the polarization is in the horizontal direction corresponding to the current flow.

Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) as we have discussed above, and circular polarization (in which the two axes of the ellipse are equal). In linear polarization the electric field of the radio wave oscillates back and forth along one direction; this can be affected by the mounting of the antenna but usually the desired direction is either horizontal or vertical polarization. In circular polarization, the electric field (and magnetic field) of the radio wave rotates At the radio frequency circularly around the axis of propagation.

"Private data" generally refers to ionospheric data that is collected from sources that are not available to the general public. Private data may be historical or current ionospheric data collected by the party that is performing data transmission, or may be ionospheric data that is purchased from a third party by the party that is performing data transmission. Private data may also be high frequency data transmissions sent by skywave propagation that may be collected and analyzed for transmission properties, such as distortion, that may indicate the viability of a certain transmission frequency.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA.

Another example of a processor is an Application-Specific Integrated Circuit (ASIC). An ASIC is an Integrated Circuit (IC) customized to perform a specific series of logical operations is controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Public data" generally refers to ionospheric data that is freely available to the public or any interested party. Public data may be ionosonde data collected and made available by governmental agencies such as NASA, the National Oceanic and Atmospheric Administration (NOAA), or any other public entity that collects and distributes ionospheric data. Public data may be historic data or real-time data. Public data may also be high frequency data transmissions sent by skywave propagation that may be collected and analyzed for transmission properties, such as distortion, that may indicate the viability of a certain transmission frequency.

"Radio" generally refers to electromagnetic radiation in the frequencies that occupy the range from 3 kHz to 300 GHz.

"Radio horizon" generally refers the locus of points at which direct rays from an antenna are tangential to the ground. The radio horizon can be approximated by the following equation:

$$d = \sqrt{2h_t} + \sqrt{2h_r} \quad \text{(Equation 3)}$$

where:
d=radio horizon (miles)
$h_t$=transmitting antenna height (feet)
$h_r$=receiving antenna height (feet).

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Receive" generally refers to accepting something transferred, communicated, conveyed, relayed, dispatched, or forwarded. The concept may or may not include the act of listening or waiting for something to arrive from a transmitting entity. For example, a transmission may be received without knowledge as to who or what transmitted it. Likewise the transmission may be sent with or without knowledge of who or what is receiving it. To "receive" may include, but is not limited to, the act of capturing or obtaining electromagnetic energy at any suitable frequency in the electromagnetic spectrum. Receiving may occur by sensing electromagnetic radiation. Sensing electromagnetic radiation may involve detecting energy waves moving through or from a medium such as a wire or optical fiber. Receiving includes receiving digital signals which may define various types of analog or binary data such as signals, datagrams, packets and the like.

"Receiving Station" generally refers to a receiving device, or to a location facility having multiple devices configured to receive electromagnetic energy. A receiving station may be configured to receive from a particular transmitting entity, or from any transmitting entity regardless of whether the transmitting entity is identifiable in advance of receiving the transmission.

"Reflection point" generally refers to the location in the ionosphere at which a radio wave is refracted by the ionosphere so that it begins to travel back to the surface of the earth rather than further into the atmosphere.

"Sensor" generally refers to any device that detects or measures a physical property. The physical property that is measured may be an atmospheric condition, but this is not required. For example, a sensor may measure atmospheric conditions, such as ionospheric height. A sensor may also collect data related to temperature, wind speed, lightning, or any of a number of other weather related parameters. A sensor may be limited to the measurement of a single physical property or may be capable of measuring several different physical properties.

"Skip distance" generally refers to the minimum distance from a transmitter to where a wave from sky-wave propagation can be returned to the Earth. To put it another way, the skip distance is the minimum distance that occurs at the critical angle for sky-wave propagation.

"Skip zone" or "quiet zone" generally refers to is an area between the location where a ground wave from ground wave propagation is completely dissipated and the location where the first sky wave returns using sky wave propagation. In the skip zone, no signal for a given transmission can be received.

"Satellite communication" or "satellite propagation" generally refers to transmitting one or more electromagnetic signals to a satellite which in turn reflects and/or retransmits the signal to another satellite or station.

"Signal" generally refers to a detectable physical quantity and/or impulse by which information and/or instructions can be transmitted. The physical properties being measured to determine the signal for example can include sound, light, and/or electromagnetic radiation, to name just a few. For instance, electrical voltage and/or electrical current can be measured to determine an electrical signal transmitted by a wire, and changes to electromagnetic field amplitude, frequency, phase, intensity, and/or strength can also be used to send and detect a signal wirelessly.

"Size" generally refers to the extent of something; a thing's overall dimensions or magnitude; how big something is. For physical objects, size may be used to describe relative terms such as large or larger, high or higher, low or lower, small or smaller, and the like. Size of physical objects may also be given in fixed units such as a specific width, length, height, distance, volume, and the like expressed in any suitable units.

For data transfer, size may be used to indicate a relative or fixed quantity of data being manipulated, addressed, transmitted, received, or processed as a logical or physical unit. Size may be used in conjunction with the amount of data in a data collection, data set, data file, or other such logical unit. For example, a data collection or data file may be characterized as having a "size" of 35 Mbytes, or a communication link may be characterized as having a data bandwidth with a "size" of 1000 bits per second.

"Sky-wave propagation" refers generally to a transmission method in which one or more electromagnetic-waves radiated from an antenna are refracted from the ionosphere back to the ground. Sky-wave propagation further includes tropospheric scatter transmissions. In one form, a skipping method can be used in which the waves refracted from the ionosphere are reflected by the ground back up to the ionosphere. This skipping can occur more than once.

"Space-wave propagation" or sometimes referred to as "direct wave propagation" or "line-of-sight propagation" generally refers to a transmission method in which one or more electromagnetic waves are transmitted between antennas that are generally visible to one another. The transmission can occur via direct and/or ground reflected space waves. Generally speaking, the antenna height and curvature of the earth are limiting factors for the transmission distances for space-wave propagation. The actual radio horizon for a direct line of sight is larger than the visible or geometric line of sight due to diffraction effects; that is, the radio horizon is about 4/5 greater than the geometric line of sight.

"Spread spectrum" generally refers to a transmission method that includes sending a portion of a transmitted signal over multiple frequencies. The transmission over multiple frequencies may occur simultaneously by sending a portion of the signal on various frequencies. In this example, a receiver must listen to all frequencies simultaneously in order to reassemble the transmitted signal. The transmission may also be spread over multiple frequencies by "hopping" signals. A signal hopping scenario includes transmitting the signal for some period of time over a first frequency, switching to transmit the signal over a second frequency for a second period of time, before switching to a third frequency for a third period of time, and so forth. The receiver and transmitter must be synchronized in order to switch frequencies together. This process of "hopping" frequencies may be implemented in a frequency-hopping pattern that may change over time (e.g. every hour, every 24 hours, and the like).

"Stratosphere" generally refers to a layer of the Earth's atmosphere extending from the troposphere to about 25 to 35 miles above the earth surface.

"Transfer Rate" generally refers to the rate at which a something is moved from one physical or logical location to another. In the case of a communication link or communication network, a transfer rate may be characterized as the rate of data transfer over the link or network. Such a transfer rate may be expressed in "bits per second" and may be limited by the maximum data bandwidth for a given network or communication link used to carry out a transfer of data.

"Transmission frequency model" generally refers to a method of determining a suitable frequency for data transmission along a consistent communication path via skywave propagation. The transmission frequency model may be used to determine a suitable frequency for transmission in real time and/or may be used to predict future suitable frequencies as well as when to switch frequency of data transmission. A transmission frequency model may accept various types of data as an input, for example transmitted data streams, environmental data, historical data, and any other desired types of data for determining a transmission frequency. In some instances, a transmission frequency model may be a computer program and stored in computer memory and operable using a computer processor.

"Transmission line" generally refers to a specialized physical structure or series of structures designed to carry electromagnetic energy from one location to another, usually without radiating the electromagnetic energy through free space. A transmission line operates to retain and transfer electromagnetic energy from one location to another while minimizing latency and power losses incurred as the electromagnetic energy passes through the structures in the transmission line.

Examples of transmission lines that may be used in communicating radio waves include twin lead, coaxial cable, microstrip, strip line, twisted-pair, star quad, lecher lines, various types of waveguide, or a simple single wire line. Other types of transmission lines such as optical fibers may be used for carrying higher frequency electromagnetic radiation such as visible or invisible light.

"Transmission Path" or "Propagation Path" generally refers to path taken by electromagnetic energy passing through space or through a medium. This can include transmissions through a transmission line. In this case, the transmission path is defined by, follows, is contained within, passes through, or generally includes the transmission line. A transmission or propagation path need not be defined by a transmission line. A propagation or transmission path can be defined by electromagnetic energy moving through free space or through the atmosphere such as in skywave, ground wave, line-of-site, or other forms of propagation. In that case, the transmission path can be characterized as any path along which the electromagnetic energy passes as it is moves from the transmitter to the receiver, including any skip, bounce, scatter, or other variations in the direction of the transmitted energy.

"Transmission Station" generally refers to a transmitting device, or to a location or facility having multiple devices configured to transmit electromagnetic energy. A transmission station may be configured to transmit to a particular receiving entity, to any entity configured to receive transmission, or any combination thereof.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Triggering Data" generally refers to data that includes triggering information identifying one or more commands to execute. The triggering data and the command data may occur together in a single transmission or may be transmitted separately along a single or multiple communication links.

"Troposphere" generally refers to the lowest portion of the Earth's atmosphere. The troposphere extends about 11 miles above the surface of the earth in the mid-latitudes, up to 12 miles in the tropics, and about 4.3 miles in winter at the poles.

"Tropospheric scatter transmission" generally refers to a form of sky-wave propagation in which one or more electromagnetic waves, such as radio waves, are aimed at the troposphere. While not certain as to its cause, a small amount of energy of the waves is scattered forwards to a receiving antenna. Due to severe fading problems, diversity reception techniques (e.g., space, frequency, and/or angle diversity) are typically used.

"Unmanned Aerial Vehicle (UAV)" or "Drone" generally refers to an aircraft without a human pilot aboard. A UAV may be operated via a ground-based controller by a human and/or can be operated autonomously using an onboard computer. A UAV may also operate without human or computer aided control and may be directed by environmental factors such as wind speed and wind direction. A drone may be powered or unpowered. A UAV may include a combustion type engine (e.g., a turbine) that is powered with fuel and/or may use alternative power sources such as electrical motors that are powered with solar cells and/or a battery. By way of non-limiting examples, the UAV can include balloons, dirigible airships, blimps, airplanes, helicopters, quadcopters, gliders, and/or other types of aircraft.

"Wave Guide" generally refers to a transmission line configured to guides waves such as electromagnetic waves occurring at any frequency along the electromagnetic spectrum. Examples include any arrangement of conductive or insulative material configured to transfer lower frequency electromagnetic radiation ranging along the electromagnetic spectrum from extremely low frequency to extremely high frequency waves. Others specific examples include optical fibers guiding high-frequency light or hollow conductive metal pipe used to carry high-frequency radio waves, particularly microwaves.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A system comprising:
   a transmitter including a transmitter clock device, wherein the transmitter is configured to switch between transmission of a digital signal and an analog signal;
   a receiver including a receiver clock device, wherein the receiver is configured to receive the digital signal and the analog signal transmitted from the transmitter;
   wherein the transmitter is configured to transmit a clock synchronization signal to the receiver, wherein the clock synchronization signal is configured to synchronize the transmitter clock device and the receiver clock device;
   wherein the clock synchronization signal is embedded in the analog signal so that the clock synchronization signal is transmitted with the analog signal;
   wherein the transmitter clock device and the receiver clock device are synchronized by the clock synchronization signal without a delay when the transmitter switches from transmitting the analog signal to the digital signal; and
   wherein clock synchronization signal is transmitted with the analog signal only for the time needed to establish synchronization before the transmitter switches from the analog signal to the digital signal.

2. The system of claim 1, wherein the analog signal is an Amplitude Modulation (AM) signal.

3. The system of claim 1, wherein the clock synchronization signal is a phase modulated signal.

4. The system of claim 1, wherein the analog signal is used for station identification.

5. The system of claim 1, wherein the analog signal is an audio broadcast.

6. The system of claim 1, wherein the digital signal transmits financial trading data.

7. The system of claim 1, wherein the analog signal is transmitted wirelessly by skywave propagation.

8. The system of claim 1, wherein the transmitter clock device and the receiver clock device are set based on time data received from a global positioning system.

9. A method comprising:
   embedding a clock synchronization signal in an analog signal wherein the clock synchronization signal is configured to synchronize a transmitter clock and a receiver clock;
   transmitting the analog signal and the embedded clock synchronization signal from a transmitter to a receiver;
   switching the transmission from the transmitter from the analog signal to a digital signal;
   wherein the transmitter clock and the receiver clock are synchronized by the clock synchronization signal without a delay when the transmitter switches from transmitting the analog signal to the digital signal; and
   wherein the clock synchronization signal is transmitted with the analog signal only for the time needed to establish synchronization before the transmitter switches from the analog signal to the digital signal.

10. The method of claim 9, wherein the analog signal is an Amplitude Modulation (AM) signal.

11. The method of claim 9, wherein the clock synchronization signal is a phase modulated signal.

12. The method of claim 9, wherein the analog signal is used for station identification.

13. The method of claim 9, wherein the analog signal is an audio broadcast.

14. The method of claim 9, wherein the digital signal transmits financial trading data.

15. The method of claim 9, wherein the analog signal is transmitted wirelessly by skywave propagation.

16. The method of claim 9, wherein the transmitter clock and the receiver clock are set based on time data received from a global positioning system.

* * * * *